(12) United States Patent
Bhatt et al.

(10) Patent No.: US 7,949,953 B2
(45) Date of Patent: May 24, 2011

(54) DESIGNING AND GENERATING CHARTS TO GRAPHICALLY REPRESENT DATA IN A DATA SOURCE

(75) Inventors: Ankur Bhatt, Bangalore (IN); Sanjay Kapoor, Bangalore (IN); Aurobinda Pradhan, Bangalore (IN)

(73) Assignee: SAP Aktiengesellschaft, Walldorf (DE)

( * ) Notice: Subject to any disclaimer, the term of this patent is extended or adjusted under 35 U.S.C. 154(b) by 901 days.

(21) Appl. No.: 10/857,336

(22) Filed: May 28, 2004

(65) Prior Publication Data

US 2004/0252136 A1 Dec. 16, 2004

Related U.S. Application Data

(63) Continuation-in-part of application No. 10/648,108, filed on Aug. 26, 2003.

(60) Provisional application No. 60/478,255, filed on Jun. 13, 2003.

(51) Int. Cl.
*G06F 17/00* (2006.01)
*G06F 3/048* (2006.01)

(52) U.S. Cl. ........................... 715/771; 715/211

(58) Field of Classification Search .................. 715/771, 715/211
See application file for complete search history.

(56) References Cited

U.S. PATENT DOCUMENTS

| | | | |
|---|---|---|---|
| 5,892,909 A | 4/1999 | Grasso | |
| 5,894,311 A | 4/1999 | Jackson | |
| 6,031,625 A | 2/2000 | Sherman et al. | |
| 6,151,624 A * | 11/2000 | Teare et al. | 709/217 |
| 6,332,163 B1 | 12/2001 | Bowman-Amuah | |
| 6,615,253 B1 | 9/2003 | Bowman-Amuah | |
| 6,629,081 B1 | 9/2003 | Cornelius | |
| 6,631,497 B1 | 10/2003 | Jamshidi | |
| 6,901,403 B1 | 5/2005 | Bata et al. | |
| 6,907,404 B1 * | 6/2005 | Li | 705/36 R |
| 6,920,608 B1 * | 7/2005 | Davis | 715/209 |
| 7,062,502 B1 | 6/2006 | Kesler | |
| 2003/0023670 A1 | 1/2003 | Walrath | |

(Continued)

FOREIGN PATENT DOCUMENTS

CA 2151654 12/1996

OTHER PUBLICATIONS

Blattner et al. "Special Edition Using Microsoft Excel 2000." Que Publishing. May 1999.*

(Continued)

*Primary Examiner* — Doug Hutton
*Assistant Examiner* — Soumya Dasgupta
(74) *Attorney, Agent, or Firm* — Fish & Richardson P.C.

(57) ABSTRACT

A method, and computer program product for performing the method, is provided for defining a chart that graphically represents data stored in an electronic data source. The method includes receiving a user selection of 1) a data object family contained in the electronic data source, and 2) an attribute for the selected data object family. The selected attribute has multiple possible predefined values that are to serve as category axis values in the chart. The method also includes receiving a user definition of a first data series comprising a value measure to be determined for each of the category axis values and that uses stored data associated with the data object family. The method also includes storing an electronic chart definition file containing an identification of the selected data object attribute and the defined first data series.

20 Claims, 17 Drawing Sheets

U.S. PATENT DOCUMENTS

| | | | |
|---|---|---|---|
| 2003/0046209 | A1 | 3/2003 | Brandenberger et al. |
| 2003/0126136 | A1 | 7/2003 | Omoigui |
| 2004/0019560 | A1 | 1/2004 | Evans |
| 2005/0080757 | A1 | 4/2005 | Sharma et al. |

OTHER PUBLICATIONS

"Web-Enabled Business Reporting," *Ernst & Young LLP and Morgan Stanley*, document dated Sep. 20, 2002, obtained from the Internet on Sep. 29, 2004 at http://www.ey.com/global/download.nsf/International/WBR_Sept02_Whitepaper.pdf>, 12 pages.

"e. Report Option," *Actuate*, document dated 2002, obtained from the Internet on Sep. 29, 2004 at http://www.actuate.com/download/A8ereportoption.pdf>, 7 pages.

"Announcing the New Datawatch/ES 4.0 Enterprise Reporting Solution," *The Monarch Report*, Feb. 2003, obtained from the Internet on Sep. 29, 2004 at http://www.datawatch.com/pdf/products/monarch/Feb03_Report_Final.pdf>, 7 pages.

"Utilizing Ole in Office XP/2000". *Create for Mississippi*, retrieved from the Internet on Oct. 14, 2004 at http://www.create.cett.msstate.edu/create/howto/ole.pdf>, document dated Aug. 2001, 7 pages.

"StarOffice™ 6.0 Office Suite", *Sun Microsystems*, retrieved from the Internet on Oct. 14, 2004 at http://www.sun.com/products-n-solutions/edu/success/pdf/Star_Office_6.0.pdf>, document undated, 6 pages.

"Diagra™ Graphics Server" *ReportLab Europe Ltd.*, retieved from the Internet on Oct. 14, 2004 at http://www.reportlab.com/docs/diagra-ds.pdf>, document dated Jan. 2003, 5 pages.

http://www.pcmag.com/article2/0,4149,101168,00.asp—Brown et al., "How to Print From a PDA," Dec. 5, 2000, 6 pages.

http://www.pcmag.com/article2/0,4149,193754,00.asp—Brown et al., "Quick PDA Data Exchange," May 22, 2001, 6 pages.

http://www.news.com.com/2100-1033-861812.html—Charny, "Data, Downloads and Microsoft," document stated to be last modified Mar. 18, 2002, 4 pages.

http://www.carchip.co.uk/downloads/dr_palm_download.pdf—"Palm Download Kit Installation Instructions," Printed from the Internet Oct. 20, 2003, 9 pages.

http://www.sfatek.com/cus.htm—"FAQ page," Printed from the Internet on Oct. 20, 2003, 5 pages.

Help menus for export operation in Microsoft® Outlook® 2000 SR-1 (9.0.0.3821), 7 pages.

Help menus for field copy operation in Microsoft® Outlook® 2000 SR-1 (9.0.0.3821), 6 pages.

Chehayeb, Nader N. et al.; "Applications of Simulation in Progress Reporting and Control", ACM, 1995. pp. 1009-1016.

Kukich, Karen,"Knowledge-Based Report Generation: A Technique for Automatically Generating Natural Language Reports from Databases". ACM, 1983, pp. 246-250.

Kukich, Karen, "Design of a Knowledge-Based Report Generator", Association for Computational Linguistics, Jun. 1983, pp. 145-150.

Masuishi, Tetsuya et al.; "A Reporting Tool Using 'Programming by Example' for Format Designation", ACM 2000, pp. 177-180.

Non-final Office Action dated Aug. 24, 2007 (U.S. Appl. No. 10/698,089). 19 pages.

Non-final Office Action dated Aug. 16, 2006 (U.S. Appl. No. 10/698,089), 29 pages.

Non-final Office Action dated Feb. 16, 2006 (U.S. Appl. No. 10/698,089), 18 pages.

U.S. Appl. No. 10/698,089, for "Generating Electronic Reports of Data Displayed in a Computer User Interface List View". filed Oct. 31, 2003.

U.S. Appl. No. 10/648,108, for "Designing Business Content for Reporting", filed Aug. 26, 2003.

* cited by examiner

DESIGNING AND GENERATING CHARTS TO GRAPHICALLY REPRESENT DATA IN A DATA SOURCE

CROSS REFERENCE TO RELATED APPLICATIONS

This application claims priority from U.S. Provisional Patent Application Ser. No. 60/478,255, filed Jun. 13, 2003, and titled "Designing Business Content, Reports, Charts and Instant Reports for Mobile Applications," and is a continuation-in-part of U.S. patent application Ser. No. 10/648,108, filed Aug. 26, 2003, and titled "Designing Business Content for Reporting," both of which are incorporated by reference in their entirety.

TECHNICAL FIELD

This description relates to designing and generating graphical charts.

BACKGROUND

Various types of graphical charts are known, as well as software tools that may be used to create and display graphical charts. Some examples of graphical charts include bar charts and pie charts. Charts are very useful in that they allow data to be presented in a form that helps a viewer readily understand the significance of the data.

Business computing systems contain a lot of data that are useful in making business decisions, and the use of graphics in displaying this data could potentially be very helpful. Unfortunately, the task of creating a useful graphical chart for the stored data can be very time-consuming, and in some cases the task of designing a chart requires too much training time in how to use a graphics software program. In addition, often the people who have the detailed knowledge of how to use a graphics software program are not the people who have the necessary business knowledge to understand what graphical representations of the data would be useful.

SUMMARY

The invention provides techniques for easily designing and generating graphical charts that use data stored in a computing system.

In one aspect, a method is provided for defining a chart that graphically represents data stored in an electronic data source. The method includes receiving a user selection of 1) a data object family contained in the electronic data source, and 2) an attribute for the selected data object family. The selected attribute has multiple possible predefined values that are to serve as category axis values in the chart. The method also includes receiving a user definition of a first data series comprising a value measure to be determined for each of the category axis values and that uses stored data associated with the data object family. The method also includes storing an electronic chart definition file containing an identification of the selected data object attribute and the defined first data series.

In different implementations, the method may include one or more of the following features. The method may further include receiving a user definition of a second data series comprising a second value measure to be determined for each of the category axis values and that uses stored data associate with the data object family, and also storing the defined second data series in the stored electronic definition file. The defined first and second data series may be defined to use a common value axis scale, or different value axis scales.

The method may also include defining an invocation command that causes the chart to be generated during a run time. The invocation command may be a user navigation to a preselected component of a software application to which component the predefined chart is defined to be assigned. The method may also include receiving a user definition of one of a plurality of chart types for the chart, the chart type being defined from a group of possible chart types comprising a bar chart, a line chart and a pie chart.

The method may also include receiving user definitions of look-and-feel attributes for the chart. The user definitions of the look-and-feel attributes may be received within a launched chart control component. The method may also include receiving user definitions of an electronic database query that causes data needed to generate the predefined chart to be retrieved from the electronic data source.

In another aspect, a user computer program product is provided that enables the above-described methods to be performed. The computer program product is tangibly stored on an information carrier (for example, memory or a propagated signal) and comprises program instructions that, when executed, perform the method to define a chart that graphically represents data stored in an electronic data source.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference symbols in the various drawings indicate like elements.

DETAILED DESCRIPTION

Figure 1:
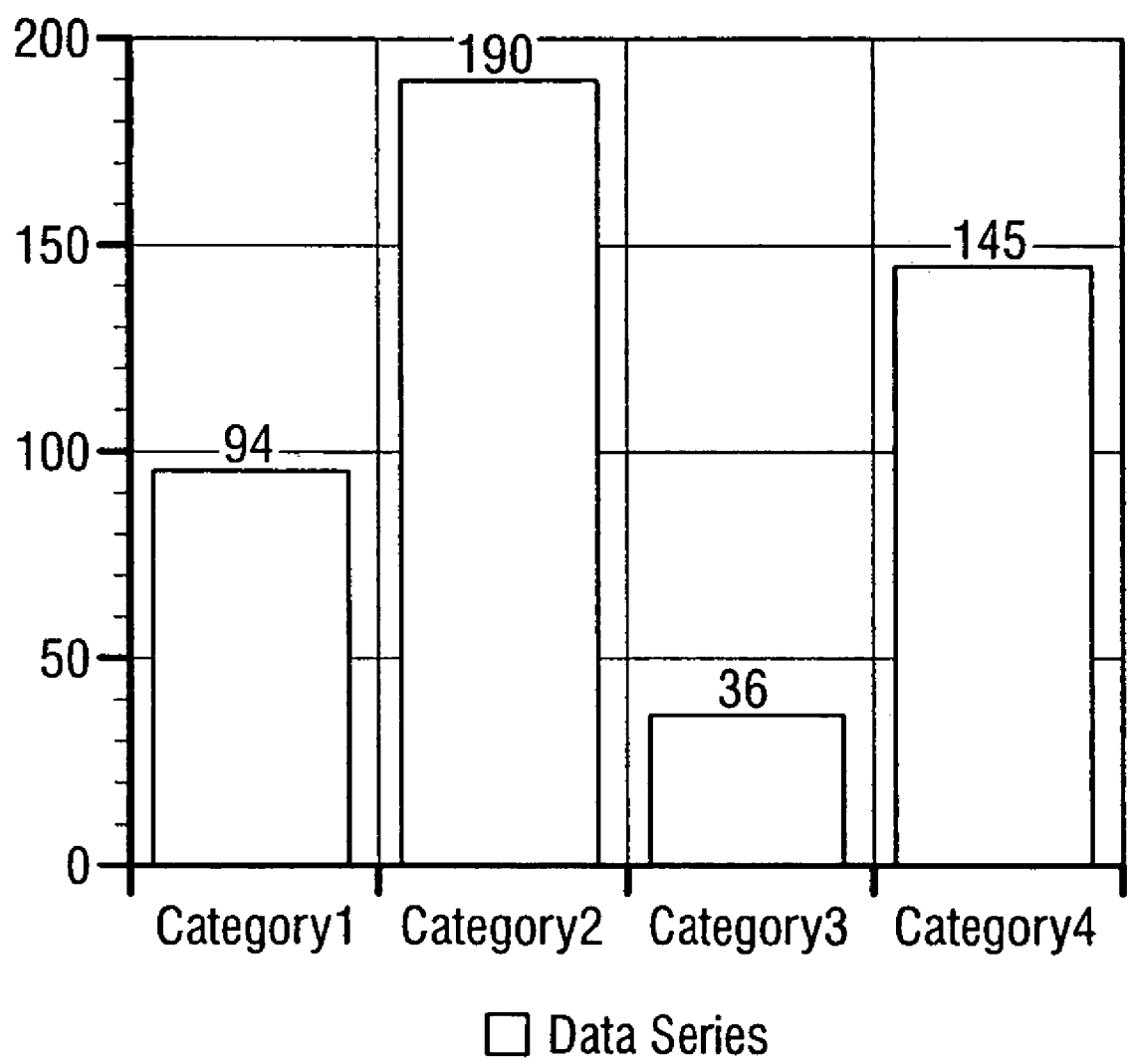
FIGS. 1-4 are example graphical charts that may be designed and generated using techniques of the invention.

FIGS. 1-4 show several charts and will be helpful in providing a full understanding of the invention. In FIG. 1, a bar chart is shown. The X-Axis (horizontal) may be referred to as a "category axis." In this example, there are four categories—"Category1" through "Category4"—that are provided on the category axis. These categories may be referred to as "category values."

The Y-Axis of FIG. 1 may be referred to as a "value axis." Value measures are plotted against the value axis for each category. The value measures may collectively be referred to as a "data series." The "bars" shown in the chart for each category depict a magnitude value for the value measure. A graphical display such as the one shown in FIG. 1 is useful because it makes it easy to tell the relative magnitudes between the value measures for the different categories.

Figure 2:
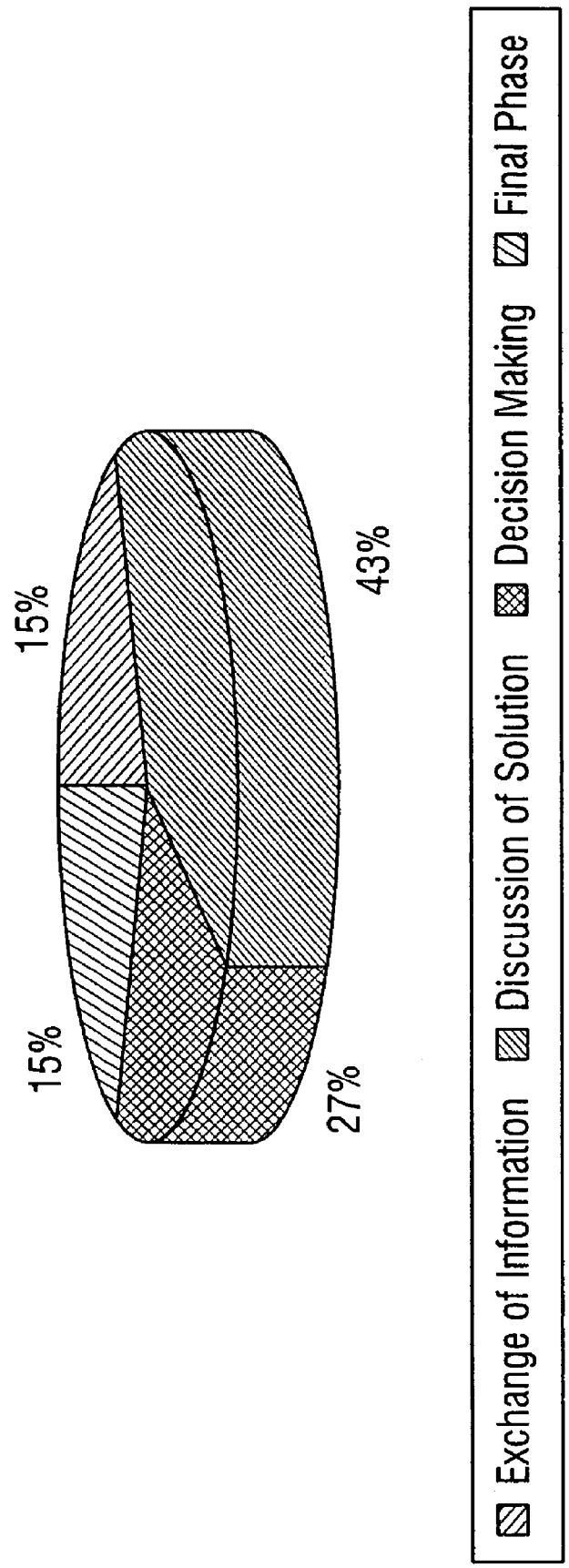

Referring now to FIG. 2, a conventional pie chart is shown. Each "slice" of the pie chart represents a different category. In this example, the "categories" are different phases of a sales opportunity, which includes the following phases: 1) exchange of information, 2) discussion of solution, 3) decision making, and 4) final decision. In this sense, a pie chart may be said to have a category axis. Similar to a bar chart, a pie chart provides a value measure for each category axis value. Unlike the bar chart shown in FIG. 1, however, the value measures in a pie chart must be provided in percentage terms. A bar chart may also provide value measures expressed as percentages, but also may provide value measures in absolute terms.

Figure 3:
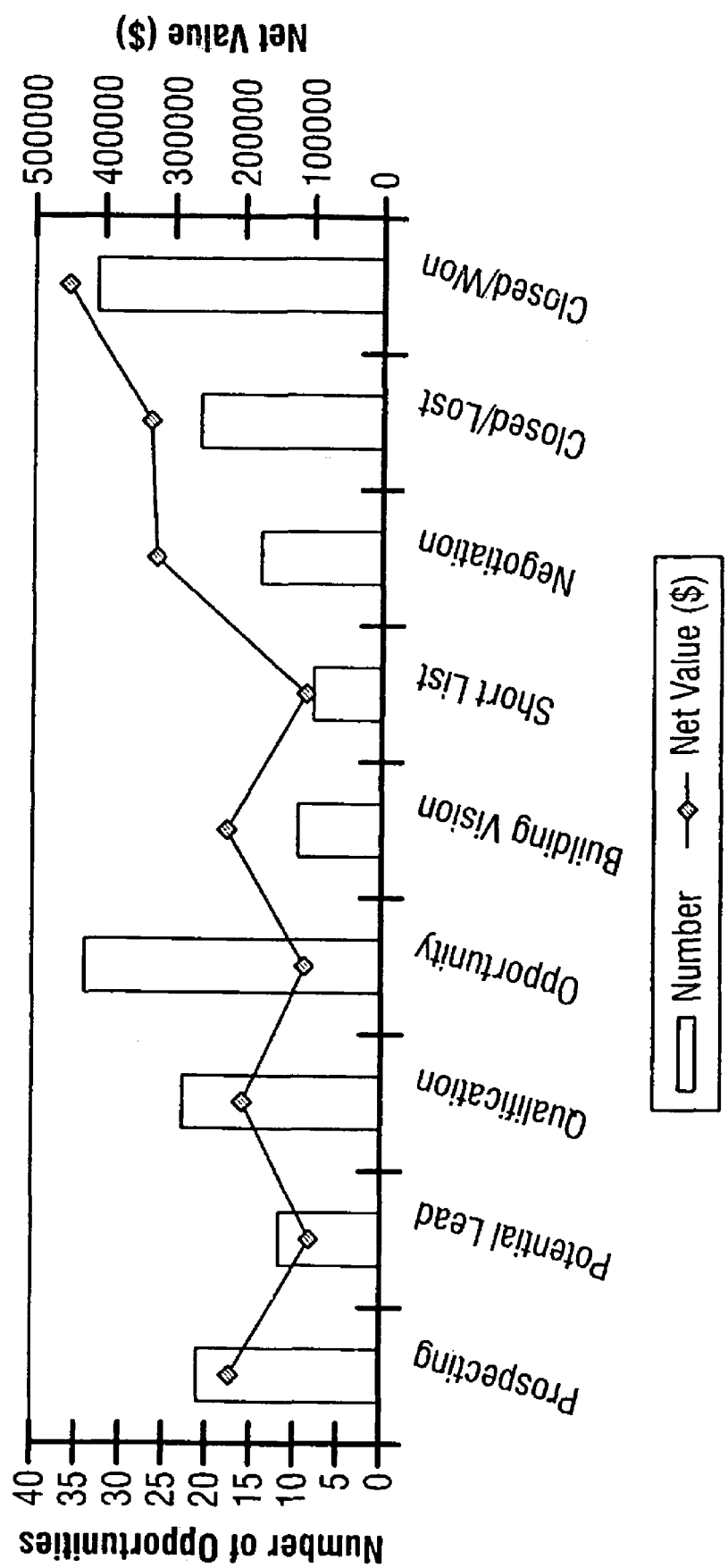

FIG. 3 shows a combined bar/line chart that has a value axis (Y-Axis) against which two different data series are plotted, instead of just one data series as in the bar chart of FIG. 1. In other words, the value axis may be said to have two sub-properties. The category axis (X-Axis) in the FIG. 3 example is a defined phase of a sales opportunity, from a "prospecting" phase to a "closed/won" phase. The two data series that are plotted against the value axis (Y-Axis) are 1) a measure of the number of sales opportunities, which has a scale shown on the left side of the chart, and 2) a net value measure in dollars, which has a scale shown on the right side of the chart. As indicated by the legend under the chart, the sales opportunity measures for each opportunity phase are shown by the bars in the chart, and the net dollar value numbers for each opportunity phase are shown by the points through which the line of the line chart is drawn.

Figure 4:
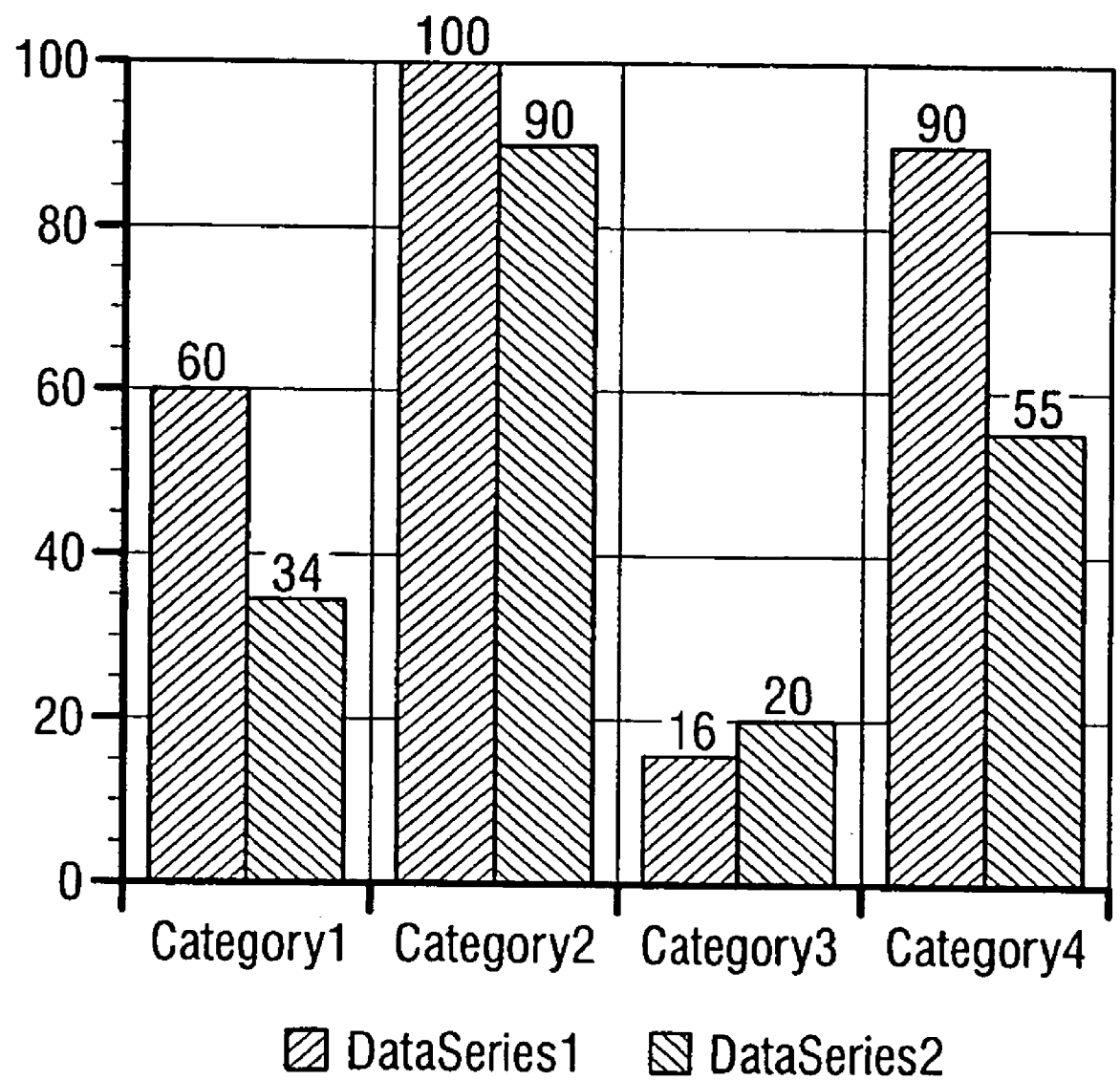

FIG. 4 shows a bar chart with a value axis that, like the FIG. 3 chart, has two different data series, but unlike the FIG. 3 chart, the two data series in the FIG. 4 chart use a common scale. A chart of this nature may be useful where it is desired to display different filterings of the same data series. For example, "dataseries1" may be a total for the data series that occur in the year 2003, whereas "dataseries2" may be a total for the data series that occur in the year 2004.

Figure 5:
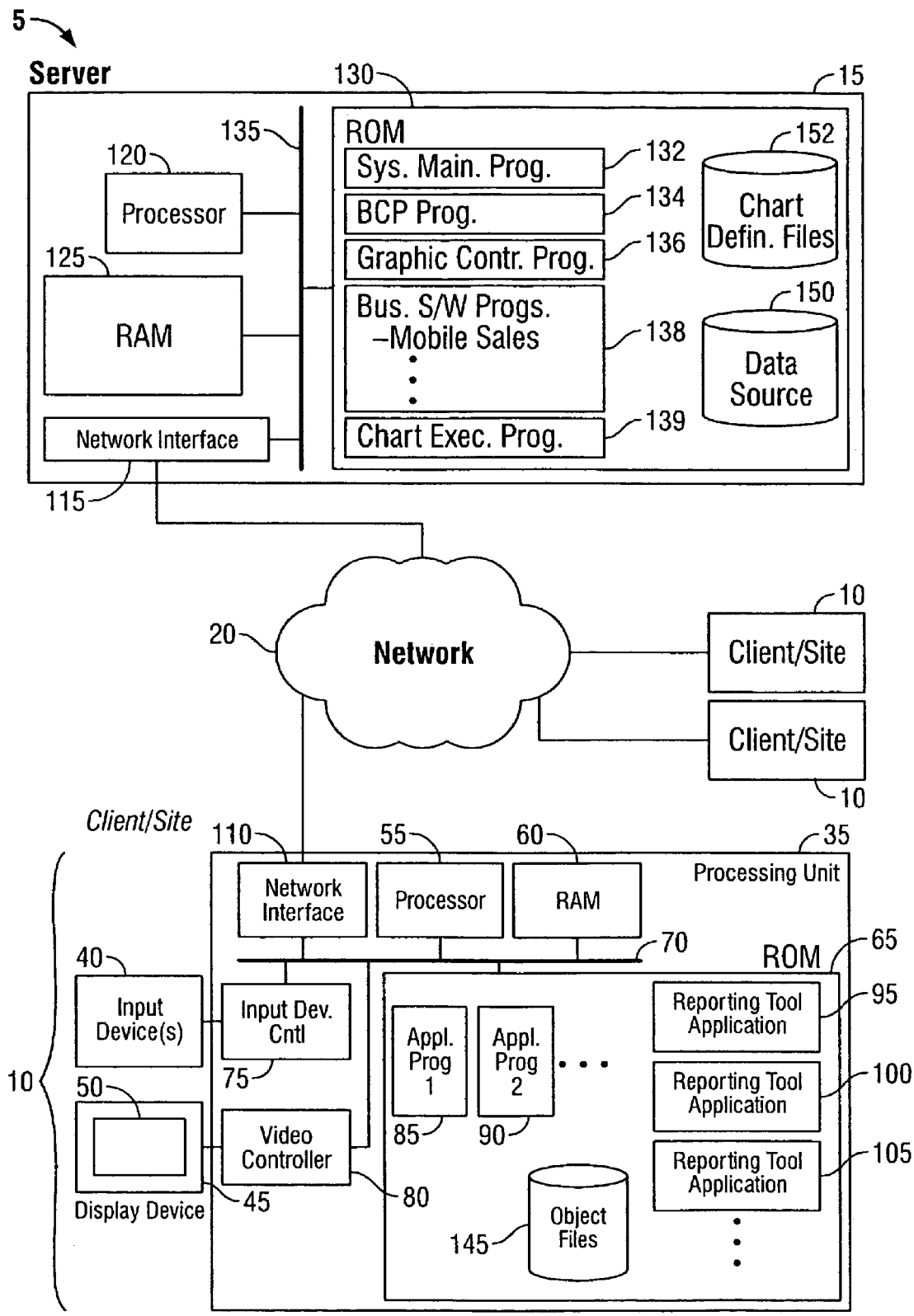
FIG. 5 is a block diagram of a computing system with capabilities for designing and generating graphical charts using techniques of the invention.

Referring now to FIG. 5, a business computing system 5 is shown that is provided with the capability of defining and generating graphical charts that use data stored in the business computing system 5. The computing system 5 includes several client site computer systems 10, a central server 15, and a network 20 over which the client computer systems 10 may communicate with the server 15. Various other configurations of networked computing systems may also incorporate aspects of the invention.

The server 15 includes, as is conventional, a processor 120, random access memory (RAM) 125, a read-only memory (ROM) 130, and a network interface 115, all interconnected by a system bus 135. Various software programs are stored in ROM 130, and may be loaded into RAM 125 for execution. The software programs include, in this example, a system maintenance program 132 that, in addition to other functions, may be used to create and revise graphical chart definitions.

A business content provider program 134 is used to design and execute database queries that may, for example, be used at run time to extract data from a data source 150 for use in generating a graphical chart. In one implementation, the business content provider program 134 is made up of several different application program modules, some of which reside on a central server, such as server 15, while others reside on a client computer system, such as system 10. In other implementations, the business content provider program 134 can reside entirely on the server 15, or entirely on the client computer system 10.

A graphics control program 136 is used for chart graphics functions, both in designing graphical charts and in their execution. A wide variety of commercially available software programs may be used as the graphics control program 136, or the program 136 may be a custom design. Business software programs 138 are also included in ROM 130. One example of a business software program is a mobile sales solution. A mobile sales solution can be used by mobile users (e.g., laptop or personal digital assistant (PDA) users) to manage the interactions a company may have with its customers, for example, marketing, sales, and service functions. Other example software programs include various customer relationship management software applications and supply chain management applications, to name a few examples. Also provided within system 5 is a chart execution program 139 and a database 152 of chart definition files.

Moving now to the client site computer system 10, the system includes a processing unit 35, one or more input devices 40, and a display device 45 upon which a user may be presented displays. The display device 45 has a video screen 50 upon which displays may appear. As is conventional, the processing unit 35 includes a processor 55, random access memory (RAM) 60, read-only memory (ROM) 65, and a network interface 100, all interconnected by a system bus 70. Input device controllers 75, also connected to the system bus 70, receive command signals from input devices 40 and forward the command signals in the appropriate format for processing. A video controller 80, connected to the system bus 70, receives video command signals and generates the appropriate video signals that are forwarded to the display device 45 so that the desired display is provided on the screen 50. The computer system 10 is not limited to a personal computer such as a desktop or laptop, but could instead include a PDA (or other handheld computing device), a terminal, a workstation, or other such device. The client computer systems 10 could be mobile units at various sites in a sales region, for example.

ROM 65, as is conventional, provides non-volatile data storage including magnetic disk memory, flash memory, removable non-volatile storage media, and the like. Various application programs 85, 90, etc., as is conventional, have program instructions that may be loaded into RAM 60 during operation. Also, the client system 10 may include various reporting tool applications 95, 100, 105, etc., and may have locally stored database object files 145. Processor 55 then may execute the program instructions to perform desired program functions. The components just described could be combined or separated in various manners, and could be stored in various manners, such as on various non-volatile storage media.

Computer system 10 has a network interface 110 connected to its system bus 70, and to network 20. As such, computer system 10 may access server 15 via network 20 to run applications residing on the server 15. Network 20 may be, for example, a local area network (LAN), wide area network (WAN), or the Internet.

A user can use an input device 40, such as a mouse, keyboard, trackball, stylus, joystick, etc., to provide input and make selections that can affect application program operation. I/O devices such as a printer (not shown) can be used to print results. Devices such as memory controllers, power supplies, etc., are omitted for clarity. The components described with regard to FIG. 1 could be combined or separated in various manners. Any of the entities described above in client or server non-volatile memory 65 or 130 could alternatively be located in a separate server, database, or computer system, and could be stored on various non-volatile storage media.

FIGS. 6-9 are screen snapshots that illustrate the operation of a software program, such as the system maintenance program 132 shown in the FIG. 5 system, that enables chart definitions to be designed and maintained by a user. A first screen snapshot 600, shown in FIG. 6, generally has a menu listing area 602 on the left side of the screen and a larger work area 604 to the immediate right of the menu listing area 602. The menu listing area 602, in this example, provides a menu of components for a "mobile system maintenance" program, as indicated by the title at the top of the menu. Therefore, in this example the chart maintenance functions are included among other maintenance functions for a "mobile system" software application. In other examples, the chart maintenance program may be a stand-alone software module, or may be integrated with different software programs.

In the menu listing area 602, various expandable menu topics are listed under the "mobile system maintenance" heading. As seen, one of the listed topics is a "charts" component, which is the component that is used to design and maintain a chart definition. The "Charts" component is shown in expanded form to identify its sub-components, which include a "Search" function, a "Details" function, an "Element Descriptions" function, and a "Parameter Descriptions" function. In the FIG. 6 screen snapshot, the "Details" function is shown selected (highlighted), and as such, "Details" work area is provided within work area 604.

The chart details work area 604 is made up of several graphical user interface tiles that are arranged within the work area. Collectively, the tiles provided in the work area may be referred to as a tile set. In the upper left corner of the work area 604, there is a "chart definition" tile 606. Within this tile, there is shown various definition fields and user-created values for those fields. The first field is a "Chart Unique Identifier," which is a user-created unique identifier or computer-generated unique identifier that is associated with the particular chart to distinguish it from other charts. In this example, the "Chart Unique Identifier" has been selected to be "DocNetVal." The next field in the "chart definition" tile 606 is a "chart type" field. A drop-down box may be implemented in connection the "Chart Type" field so that a user may select from various predefined chart types that may be available. In this example, a "column chart," or in other words, a "bar" chart, has been selected. Other example chart types include a pie chart, a stacked column chart, and a line chart, to name a few examples.

The next field in the "chart definition" tile 606 is a "Chart Status" field, which in this example is selected to be "executable." As selected, the chart is available to be displayed during a run time. Another option for this field, such as an "in process" option, may be selected so that the chart is not executed during a run time, for example when the chart definition has not yet been completed.

Next in the "Chart Definition" tile 606 are options for selecting how data to be used in the chart will be retrieved from a data source, such as the data source 150 shown in the FIG. 5 system. In this example, there are two possible database query tools that may be involved: a "business content provider" tool or a "business query" tool, which may be part of a mobile application studio application. In this example, the "business content provider" tool is selected. Generally, the "business content provider" tool provides a technique for creating a database query that, because it is an object-based approach, does not require in-depth computer programming experience, as may be required with other database query design tools. A more complete description of such a "business content provider" tool, and how it is used to design a database query, is provided below. In addition, such a tool is described in co-pending U.S. patent application Ser. No. 10/648,108, to Bhatt et al., entitled "Designing Business Content for Reporting," and assigned to the assignee of the present patent application.

In tile 606, displayed below the database query selectors there is a box in which the name of the database query associated with the chart is provided. In this example, the name for the associated "business content provider" database query is "DocNetVal."

At the bottom of the "chart definition" tile 606 are two user-selectable buttons. One is a "customize" button that, when selected, launches a graphical chart control software program to customize the look-and-feel of the chart being defined. Selecting the "customize" button may, for example, launch the graphic control program 136 shown in the FIG. 5 system. That application may, for example, be provided within a window on the user interface screen. The other user-selectable button is a "show chart" button that, when selected, causes the chart to be generated and displayed in a pop-up screen, to simulate what would occur and be displayed during a run time.

An "assigned components" tile 608 is provided to the immediate right of the "chart definition" tile 606. The "assigned components" tile 608 first allows a user to select, and associate with the chart, a software application and a business component for that software application. In this example, the selected software application is a "mobile sales" application, and the selected component within that application is a "marketing" component. It will be seen later that these selections define where the chart is made available to a user during a run time. The "assigned components" also is where the user identifies a data object, or business object, family for the chart. The data object family in this example is the family of "sales documents." The data objects that belong to this family are stored in the data source, for example, the data source 150 shown in FIG. 5.

Next, a "data source properties" tile 610 is provided immediately below tiles 606 and 608. Tile 610 shows, in table format, the defined chart axes. First, with respect to a "value axis" for the chart, the defined "data series" for the chart is a "SumOfCurrency" data series, as shown in the "property" column of the table. A further explanation of how a data series is defined is provided later. For present purposes, it is sufficient to understand that the "SumOfCurrency" data series is a user-defined calculation that, when calculated, uses stored data associated with the user-selected data object family identified in tile 608 (and retrieved from the data source using the defined database query identified in tile 606) to calculate a value measure for each of the defined category axis values.

Also, in the tile 610 table there is a column where it is identified whether or not a data series "property" is a currency value ("Is Currency"). A box being checked in this column indicates that the data series is a currency value. In the FIG. 6 example, the "SumOfCurrency" data series is a currency value, and the currency, as identified in the "currency field" column of the table, is to be expressed in a particular field format, which is identified as "Waerk" (a currency field format used in software systems provided by SAP A.G., of Walldorf, Germany).

The "Sum Of Currency" data series may be a calculation that is defined using the business content provider program, as will be described later. By way of example, suppose the "Sum Of Currency" data series is a sum of the monetary value of sales orders that may be stored in different currencies. The "Waerk" field may define the currency (for example, U.S. dollars, Euro, etc.) in which the value of the sales order is stored in the data source. When rendering the chart at run time, the "Waerk" field may be used to convert the order values to a common currency, and then the currency may be converted to a currency defined by a local default setting. As such, the displayed chart will display the sales order values in the locally set currency. In addition, it is necessary that the "Waerk" field value be retrieved at run time so that this common currency calculation may be performed.

Also provided in the "data source properties" tile 610 table is the defined category axis for the chart. The category axis may be defined by selecting an object attribute for the selected data object family, where the database attribute has multiple possible predefined values. In the FIG. 6 example, a "P_DE-SCRIPTION" object attribute (that is, a process activity type attribute) has been selected for the category axis. This attribute has several predefined values that will serve as the categories, or category axis values, used in the chart's category axis.

A "report parameters" tile 612 is provided at the bottom of the work area 604 and immediately under the "data source properties" tile 610. The report parameters define the database object fields for which a user may, at run time, filter the chart being displayed. By way of example, suppose a chart is being created that shows the number of different types of appointments. The user may wish to display all appointments for all business partners, or may wish to filter the chart to only display a chart of appointments for one selected business partner. In the latter case, a "property" that would be used in such a filtering would be a database object field that identifies the business partner. As such, that field will be retrieved from the data source at run time to make such a user filtering possible. In addition, to the right of the "report parameters" tile 612 is a "report parameter" tile 614 where more detail for a selected (highlighted) one of the parameters listed in the tile 612 is provided and may be specified.

Figure 6:
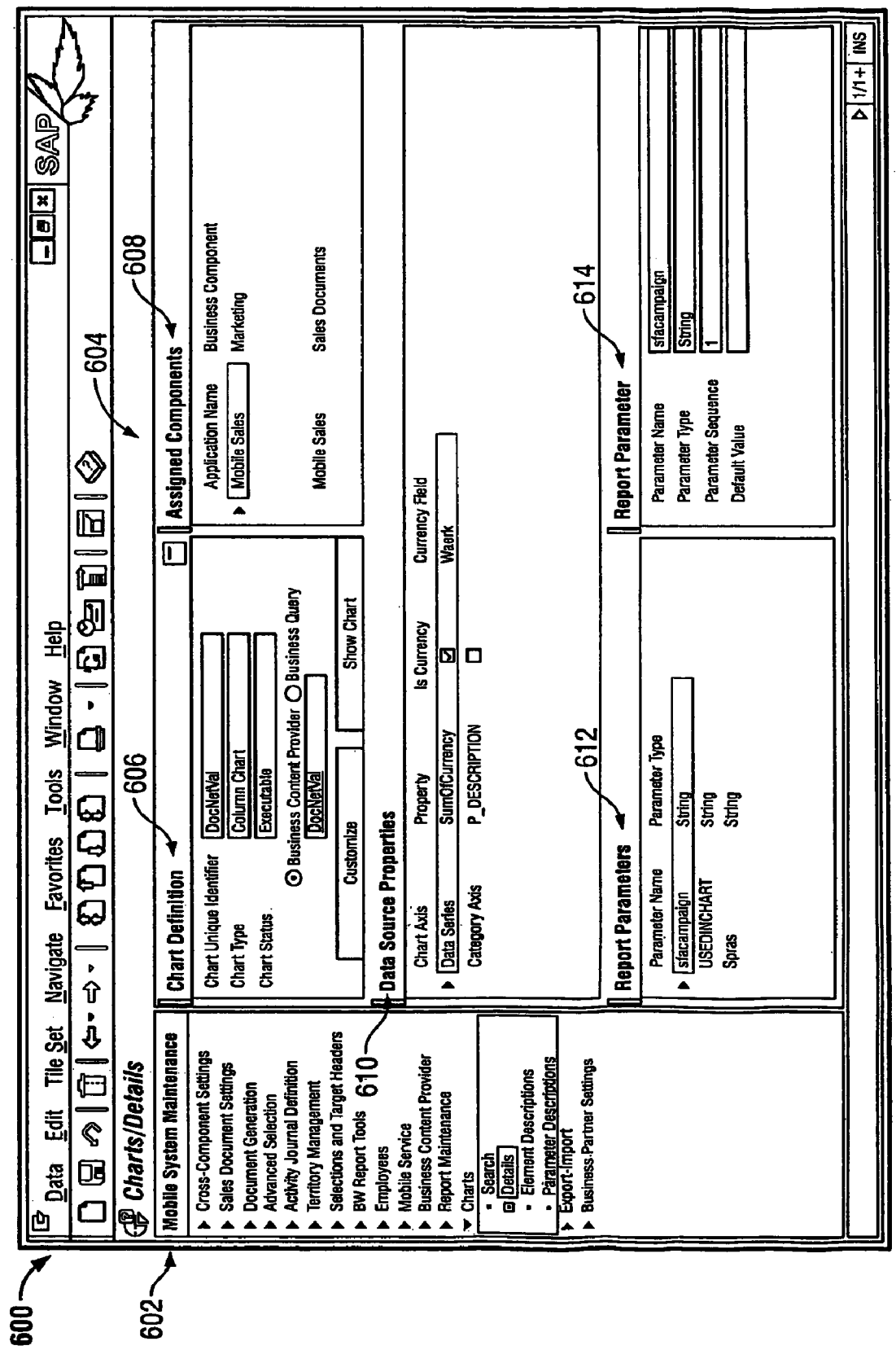
FIGS. 6-9 are computer screen snapshots that illustrate a graphical chart definition.
Figure 7:
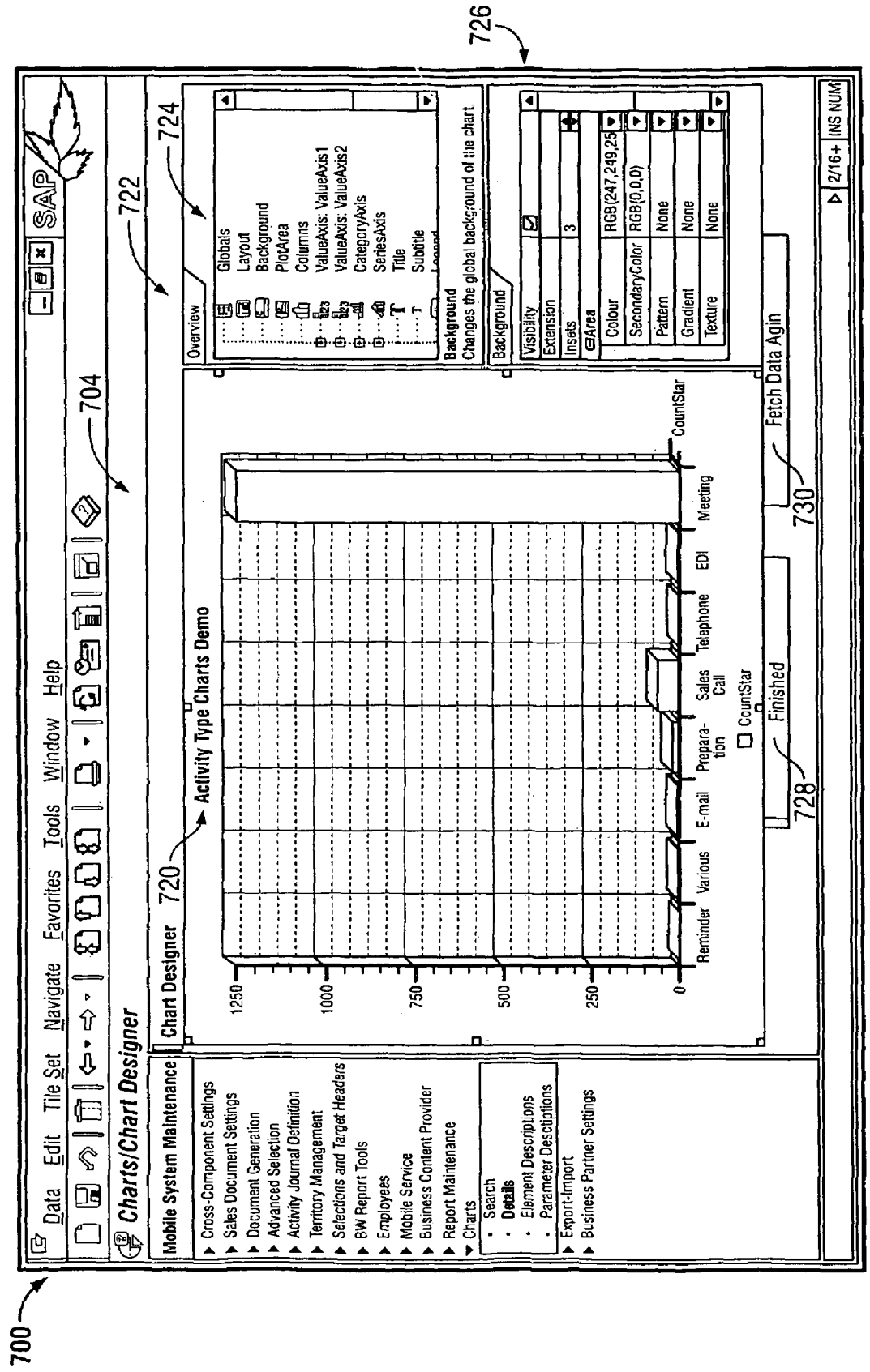

Referring now to FIG. 7, a screen snapshot 700 is shown that has displayed a chart being defined. It is noted that the chart shown in the FIG. 7 screen snapshot 700 is different from the chart shown in the previous screen snapshot 600 of FIG. 6. The type of display shown in FIG. 7 may be provided when, for example, a user selects the "customize" button shown in the FIG. 6 screen snapshot, albeit within the chart definition for the FIG. 7 chart. When the "customize" button is selected, a separate chart design software application may be launched, for example the graphics control program 136 shown in the FIG. 5 system. A resulting "Chart Designer" work area 704 includes a chart display area 720 on the left side of the work area 704, where the chart being defined is displayed in its current state.

A toolbox area 722, located immediately to the chart display area's right, displays tools that may be used to customize the look-and-feel of the chart being defined. The toolbox area 722 consists of an expandable, and collapsible, chart entities listing area 724 (namely, the "Overview" tile) that is displayed above a chart entities properties area 726. Selection of one of the chart entities in the listing area 724 causes tools for the selected chart entity to be provided in the properties area 726. In the FIG. 7 example, the "background" chart entity is shown selected in the listing area 724, and as such, the various attributes for that selected entity are provided in the properties area 726 below. As such, a user may select the look and feel for the chart's background as desired.

A user-selectable "finished" button 728, located at the bottom of the chart designer work area 704, causes a return to a previously displayed chart definition work area. In addition, a "fetch data again" button 726 is provided, also at the bottom of the chart designer work area 704, that may cause a database query to be performed to refresh the data used in the chart being displayed in the chart display area 720. In addition or alternatively, selecting button 726 may refresh the chart with the current values set with the chart design tools in 722.

Figure 8:
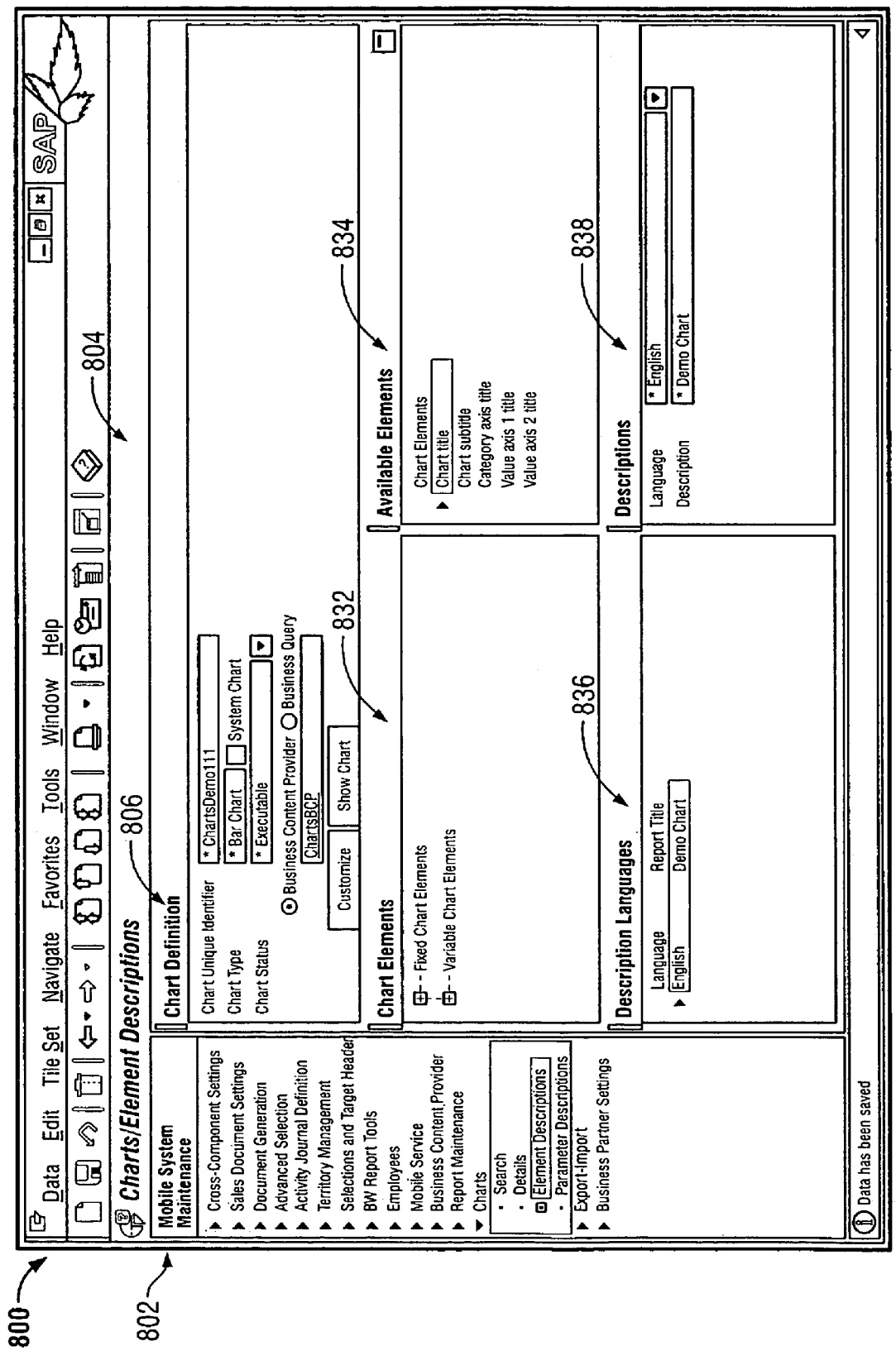

Referring now to FIG. 8, there is shown a screen snapshot 800 of a chart "Element Descriptions" sub-component, as shown selected (highlighted) in a menu listing area 802. Generally, the chart element descriptions sub-component allows a user to define descriptions for various elements of the chart. A work area 804 for the chart "element descriptions" sub-component includes a "chart definition" tile 806 similar to tile 606 shown in the FIG. 6 screen snapshot 600. A "chart elements" tile 832 and a "available elements" tile 834 are provided immediately below the "chart definition" tile 804. The "chart elements" tile 832 provides an expandable, and collapsible, listing of chart element groupings that allows a user to select one grouping. Upon selection of a particular chart element grouping from the list provided in tile 832, elements within that grouping for the selected "Bar Chart" type are displayed in the "Available Elements" tile 834. In the FIG. 8 example, the "Fixed Chart Elements" grouping is selected, and as such, the available elements for that group are displayed in tile 834. The available fixed chart elements, as shown in tile 834, include a "Chart title," a "Chart subtitle," a "Category axis title," a "Value axis 1 title," and a "Value axis 2 title" (in the event two different value axes are being used in the chart).

A "Description Languages" tile 836, provided immediately below the "Chart Elements" tile 832, provides a table showing a current user definition for a chart element that is selected in tile 834. In the FIG. 8 example, the "Chart Title" element is shown selected in tile 834, and thus the language of that title as well as the actual title ("Demo Chart") are shown in the table shown in tile 836. A "Descriptions" tile 838— provided immediately under the "Available Elements" tile 834 and to the right of the "Description Languages" tile 836—provides a display for user entry of a selected language and a selected title ("Description").

Although not shown in the FIG. 8 screen snapshot 800, when the "Variable Chart Elements" grouping is selected in tile 832, a listing of available variable chart elements for the selected "Bar Chart" type is then provided in the "Available Elements" tile 834. As an example, when the "Variable Chart Elements" group is selected in tile 832, a table may appear in tile 834 that identifies the variable chart elements for the data series and category axis, for example. As described in connection with the fixed chart elements, tiles 836 and 838 may be used in a fashion similar to that previously described to create, or revise, descriptions associated with the elements.

Referring to the menu listing 802, there is shown a "Parameter Descriptions" sub-component of the chart maintenance component. This enables descriptions to be defined for the various chart parameters discussed previously in connection with the "Report Parameters" file 612 and "Report Parameter" file 614 shown in FIG. 6.

Figure 9:
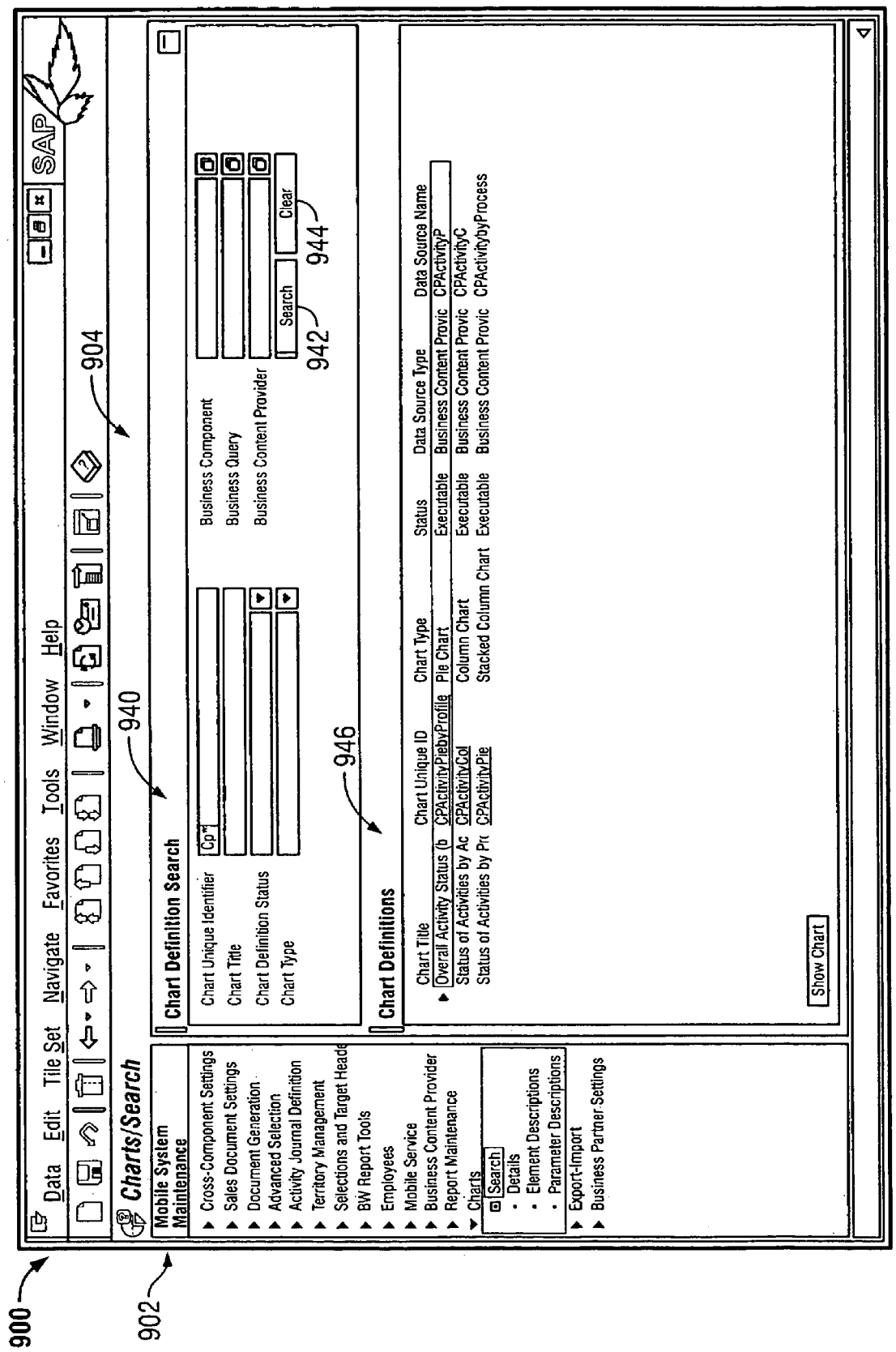

Referring now to FIG. 9, there is shown a screen snapshot 900 of a chart "Search" sub-component, as shown selected (highlighted) in the menu listing area 902. A work area 904 for the chart "Search" sub-component includes a "Chart Definitions Search" tile 940, which allows a user to enter search terms for various fields that are included in the chart definition files. In the FIG. 9 example, a search term "cp*" is entered in a "Chart Unique Identifier" field in tile 940. The "*" suffix at the end of the search term is a wildcard identifier. A user-selectable "Search" button 942 is included in tile 940 to cause a search using the entered search terms to be executed. For example, the search may be conducted of a database of chart definition files, which may, for example, be included in a database 152 of such files as shown in the example system shown in FIG. 5. A user-selectable "Clear" button 944 is also included in tile 940, and clears all search terms that have been entered in tile 940 so that new search terms may be entered.

A "Chart Definitions" tile 946 is provided immediately below the "Chart Definition Search" tile 940, and provides a list view of defined charts identified when a search entered in tile 940 has been executed. In the FIG. 9 example, three defined charts are listed with a "Chart Unique Identifier" that begins with "cp". As such, using the chart search sub-component, a user may easily find previously defined charts and revise them.

Figure 10:
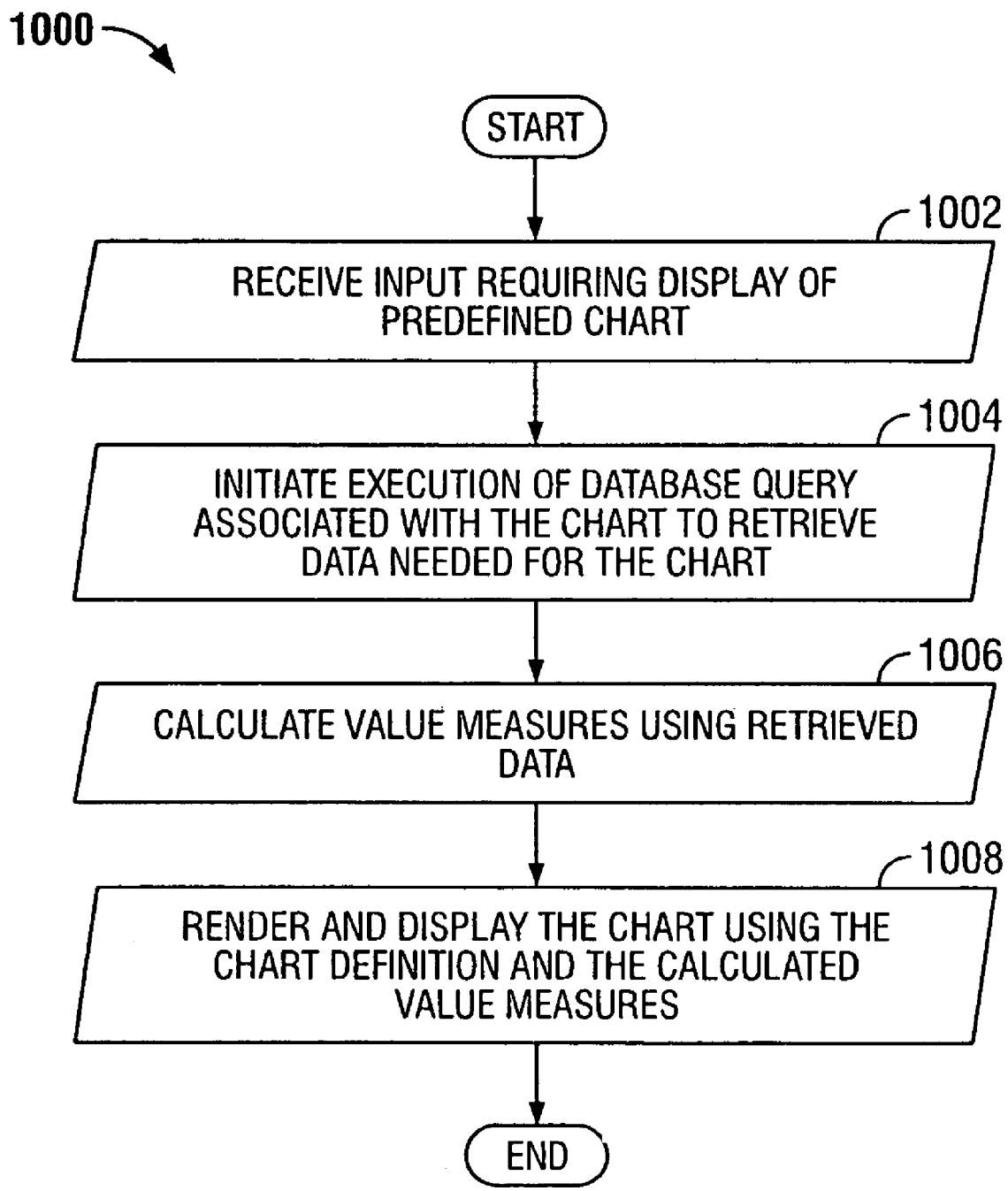
FIG. 10 is a flow chart of a process for generating a graphical chart during a run time.

Referring now to FIG. 10, a flow chart 1000 is shown that illustrates an example of how a predefined chart may be generated during a run time. The flow chart depicts steps that may be performed by a computer system upon execution of a software program such as the chart execution program 139 shown in the FIG. 5 system. The process begins, at 1002, with the receipt of a user input requiring the display of a predefined chart. Such an input may have been entered, for example, at the client device 10 shown in the FIG. 5 system, and received at the server 15. Next, at 1004, execution is initiated of a database query that is associated with the predefined chart for which the user input was received in step 1002. The associated database query to be executed is determined, for example, by first retrieving a chart definition file associated with the predefined chart, for example from the database 152 of chart definition files shown in the FIG. 5 system. The database query is performed on a data source as defined in the database query, such as in the data source 150 as shown in the FIG. 5 system. For example, the chart definition file may specify that a predefined business content provider search query be executed, which query defines the data source from which the data are to be retrieved. As such, data from the source are retrieved that are needed to generate the predefined chart.

Next, at 1006, and if necessary, value measures are calculated for each of the category axis values (that is, for each of the categories) using the retrieved data and a value measure calculation as defined for the chart. Such a value measure calculation may be defined using the business content provider program 134 provided in the FIG. 5 system, as will be described in more detail later. In some cases, no calculation will need to be performed. Finally, at 1008, the predefined chart is rendered so that it may be displayed. This may be done, for example, by launching the graphic control program 136 provided in the FIG. 5 system, and operating that program in a presentation mode. The rendering of the chart may use the value measures calculated in step 1006 (or alternatively, may use a database attribute specified for this data series where no calculation is needed) and the predefined parameters for the chart, as provided in the associated chart definition file. The chart is then displayed, for example, on the client system's display device 45 (FIG. 5).

Figure 11:
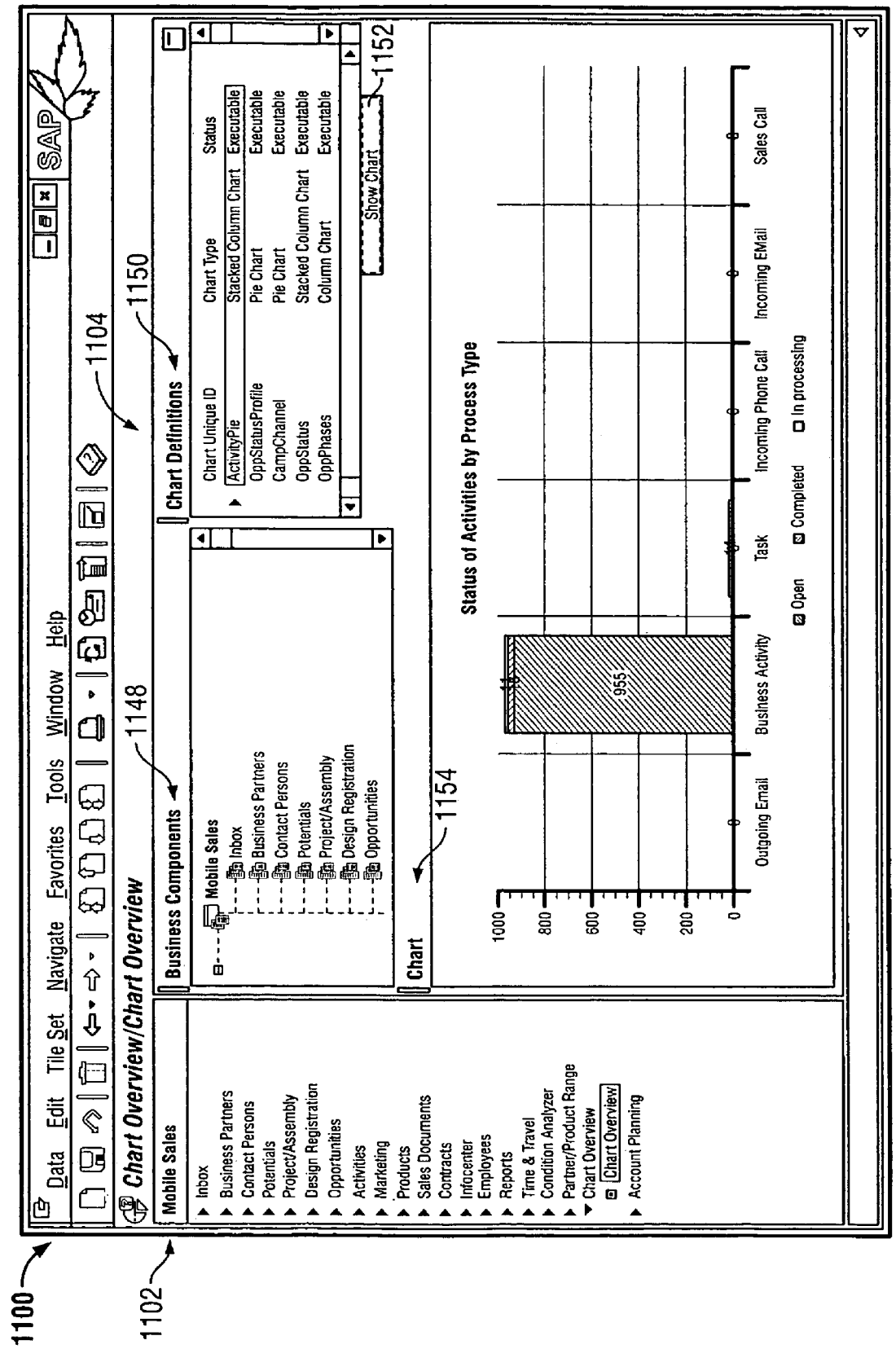
FIG. 11 is a computer screen snapshot of a graphical chart being displayed during a run time.

Referring now to FIG. 11, a screen snapshot 1100 is shown for a run-time display of a chart. In a menu listing area 1102 on the left side of the screen, it can be seen that a "Mobile Sales" software application is now being executed, as opposed to a "Maintenance" software application as was the case in FIGS. 6-9. The menu listing area 1102 provides an expandable, and collapsible, listing of so-called "business components" that make up the mobile sales software application. One of the components is a "Chart Overview" component, which in FIG. 11 includes an identically named "Chart Overview" sub-component that has been selected. When a user selects the "Chart Overview" sub-component shown in the menu listing area 1102, a work area 1104 associated with that sub-component is displayed, as shown in FIG. 11.

The chart overview sub-component work area 1104 includes a "Business Components" tile 1148 provided at a top left corner of the work area 1104. This tile 1148 provides another expandable, and collapsible, listing of the business components that make up the mobile sales software application. A "Chart Definitions" tile 1150 is provided immediately to the right of the "Business Components" tile 1150, and provides a table of several predefined charts that may be selected by a user. Tile 1150 also includes a "Show Chart" button 1152 that causes a selected predefined chart to be generated in a "Chart" tile 1154 provided at the bottom of the work area 1104. A user selection of the "Show Chart" button 1152 causes the selected chart to be generated, for example, in accordance with the run-time process shown in FIG. 10.

The chart selected in FIG. 11, as indicated in tile 1150, is a "Stacked Column" type of chart and has a unique identifier of "ActivityPie." A stacked column type of chart may be used, for example, when multiple data series are to be displayed against the chart's value axis and, preferably, when the scale for each of the data series is the same. The value measures for each data series are displayed stacked on top of one another.

The FIG. 11 chart is entitled "Status of Activities by Process Type." Such a title may be assigned using the "Element Descriptions" component shown in the FIG. 8 screen snapshot 800. Generally, the FIG. 11 chart illustrates information about a sales activities data object family. The category axis is defined to be a "Process Type" object attribute for the selected data object family. The possible values for the "Process Type" object attribute are listed along the chart's category axis and includes the following "Process type" values: "Outgoing Email," "Business Activity," "Task," "Incoming Phone Call," "Incoming Email," and "Sales Call."

The FIG. 11 chart includes three defined data series, as shown in the legend displayed under the chart. The descriptions for the three data series are "Open," "Completed" and "In Processing." These descriptions describe an attribute value for another object attribute of the data object family, namely, a "status" object attribute. The value measures for each of the category axis values (that is, for each of the categories) are the number of data objects within the defined data object family that fall within the particular category and that also have the "status" attribute value to which the data series is limited. For example, the FIG. 11 chart shows that there are 955 data objects within the data source that 1) are a member of the "activity" data object family, 2) have a "Process Type" attribute identified to be "business activity," and 3) have a "status" attribute identified to be "open."

Figure 12:
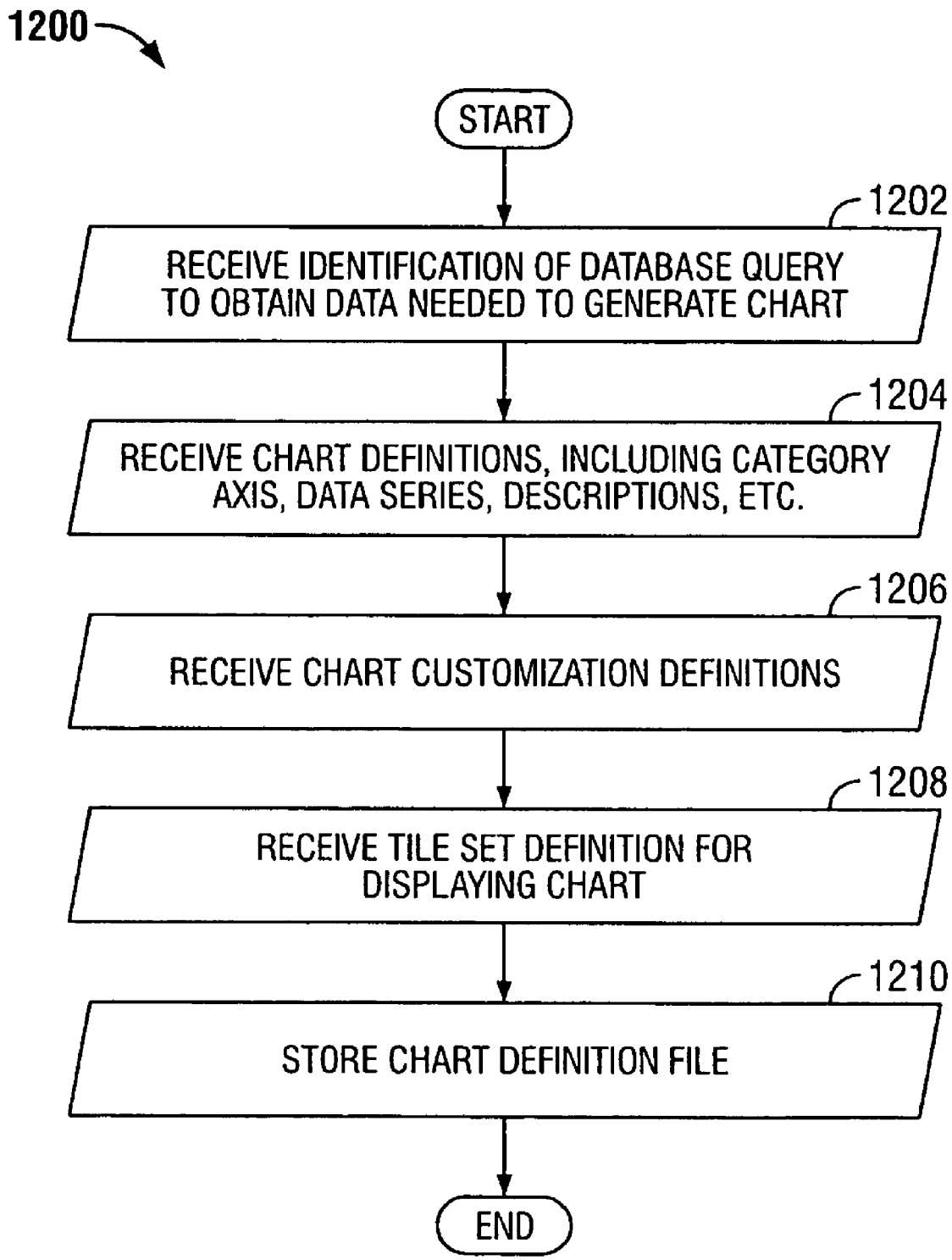
FIG. 12 is a flow chart of a process for designing a graphical chart definition during a design time.

Referring now to FIG. 12, a flow chart 1200 is shown that illustrates an example of how a predefined chart may be defined during a design time. The flow chart depicts steps that may be performed by a computer system upon execution of a software program such as the system maintenance program 132 shown in the FIG. 5 system, which may also make use of the business content provider program 134 and the graphic control program 136 also shown in the FIG. 5 system.

The FIG. 12 process begins, at 1202, with the identification of a database query that is to be used to obtain data needed to generate the chart, and that may be needed to provide for various user filterings of the chart. Such a query may be designed, for example, by a user operating at client device 10 and using the business content provider program 134 shown in the FIG. 5 system. Next, at 1204, chart definitions are received, which include, for example, a category axis definition, a data series definition, etc. More detail with respect to the various chart definitions that are, or may be, made are described in the context of both the previously described screen snapshots and in additional screen snapshots that will be described later. At 1206, chart customization definitions are received, for example, by launching a separate graphics control program such as program 136 provided in the FIG. 5 system. At 1208, tile set definitions are received that define the tile sets that include the chart. The tile set definitions define how the chart and other tiles will appear in a tile set associated with a particular business software component, for example. These may be defined using a user interface tile set definition program, such as is provided in the SAP mobile application studio program. Finally, at 1210, an electronic chart definition file is stored in memory, such as in the database 152 of such files shown in the FIG. 5 system.

Figure 13:
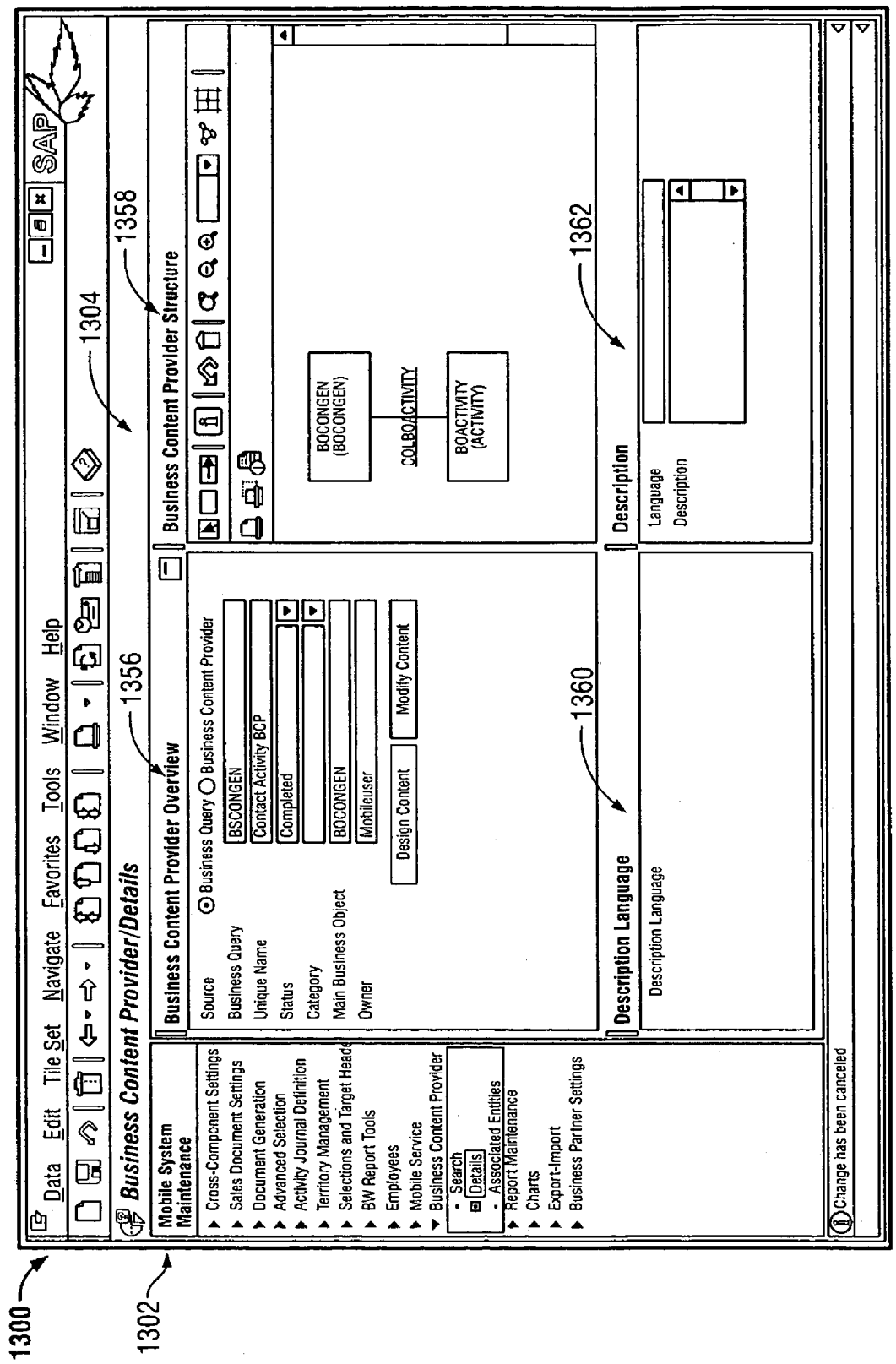
FIGS. 13-15 are computer screen snapshots that illustrate a process for designing a graphical chart definition during a design time.
Figure 14:
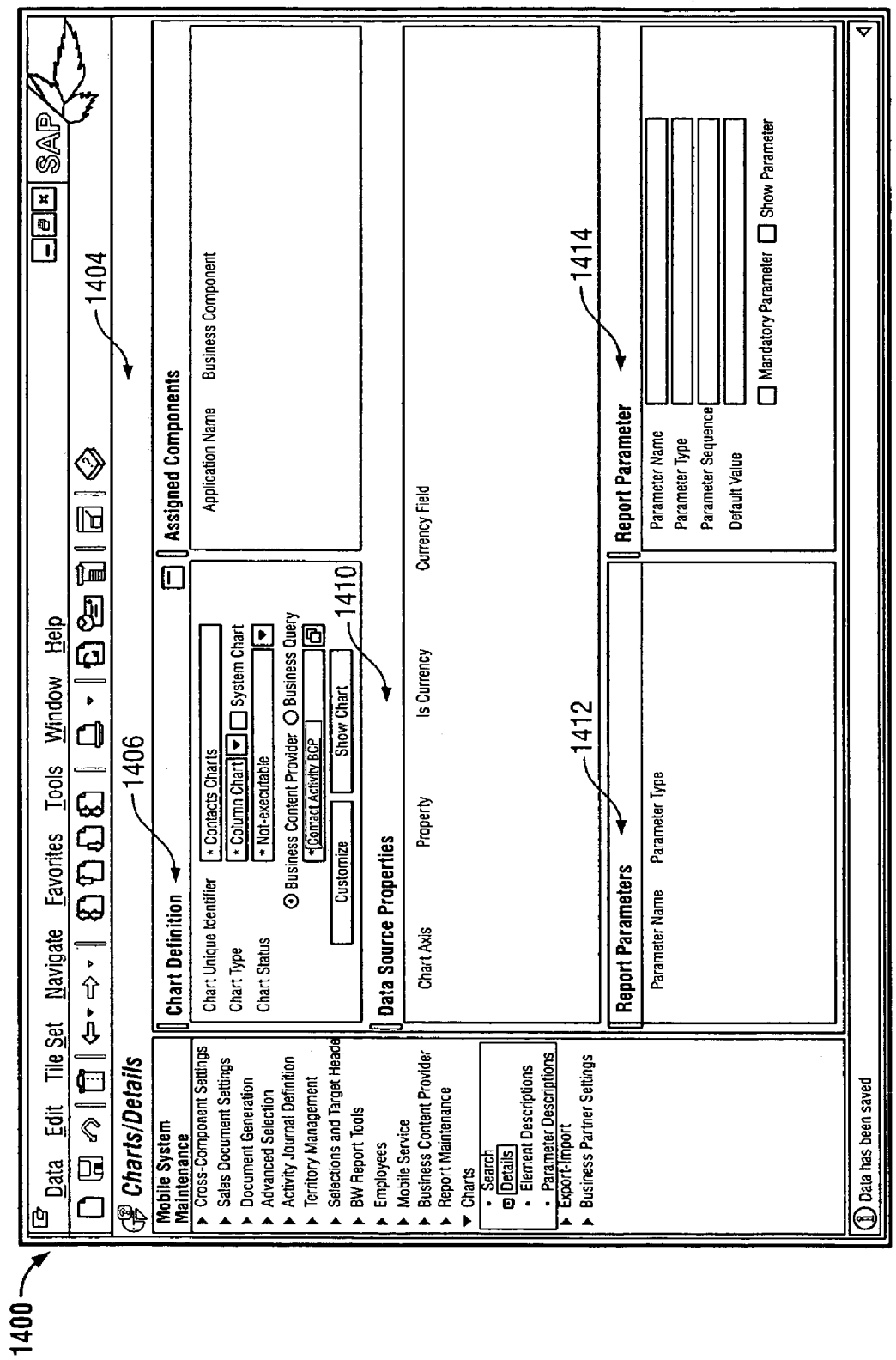
Figure 15:
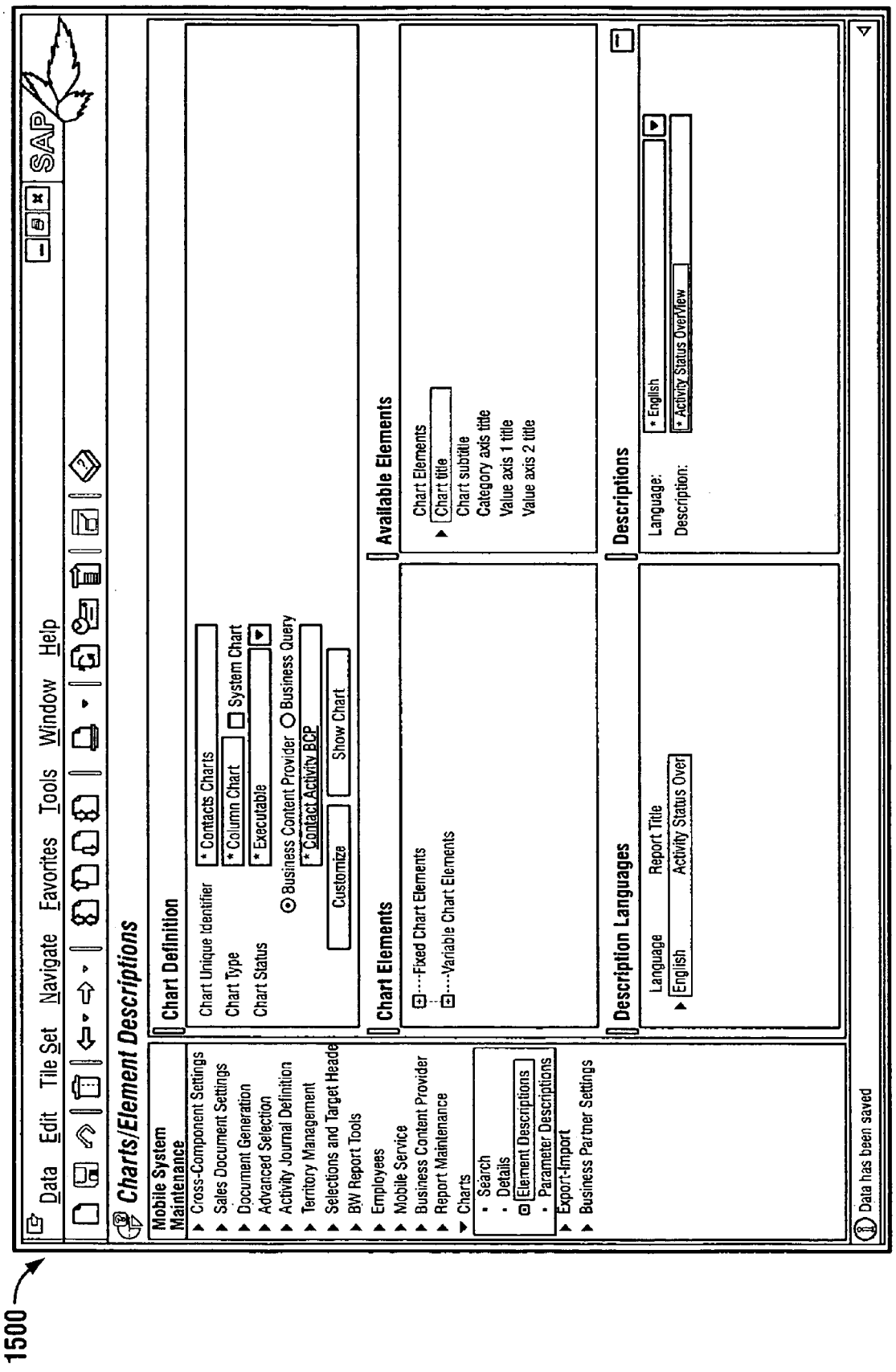

FIGS. 13-15 are screen snapshots that illustrate an example of how the design time process depicted in FIG. 12 may be implemented. Referring first to FIG. 13, a screenshot 1300 is provided that shows a defined database query that has been designed using a "business content provider" tool. This is a database query that will be executed to retrieve, from a data source, the necessary data to generate and display the chart being defined. As shown in a menu listing area 1302 on the right side of the screen, a "Details" sub-component of the "Business Content Provider" maintenance tool is shown as having been selected. As discussed previously, the "Business Content Provider" tool in this example is integrated with a mobile system software application. That need not be the case in all embodiments. Also, in one implementation, the business content provider tool may be made up of several different application program modules, some of which reside on a central server, such as server 15 (FIG. 5), while others reside on a client computer system, such as system 10. In other implementations, the business content provider component 134 can reside entirely on the server 15 (as depicted in FIG. 5), or entirely on the client computer system 10.

A business content provider work area 1304 is provided to the right of the menu area 1302, as shown in FIG. 13. The business content provider "Details" tile set includes four associated tiles shown in the work area 1304. Generally, a "Business Content Provider Overview" tile 1356 presents details of the current design and can be used to define a "Main Business Object" (that is, a database object family) for a business content structure. A "Business Content Provider Structure" tile 1358 provides a pictorial view of business objects, and the relationships between them, that are included in the business content structure. A "Description Language" tile 1360 can present a list of languages in which the design is maintained, and a "Description" tile 1362 can be used to provide a description for the business content structure.

In FIG. 13, a screen snapshot is shown for a database query whose design has been completed, as indicated by the "Completed" status indicator in tile 1356. To design the database query using the business provider tool, a wizard driven process may direct the needed user entry to design the database query that will retrieve the content needed to generate the chart. An example of such a wizard-driven process may proceed as follows. First, a pop-up window may be provided that shows a group of business queries, from which the user may select a desired business query (e.g., by using a mouse to click on a business query and then clicking on a "Select" button) to initiate a business content design. Business queries and/or business objects may comprise Visual Basic components stored locally as files, such as the files 145 stored on client computer 10 (FIG. 5). The business queries and/or business objects may have been previously designed using a mobile application studio component, for example.

In one example, suppose a user locates and selects a "BSCONGEN" business query from a group of displayed business queries. This causes a "BOCONGEN" business object to be identified as the "Main Business Object," as shown in FIG. 13. The wizard may display a "Business Object Properties: All properties" tile that includes a collection of business object attributes, each of which is associated with, and may describe aspects of, the "BOCONGEN" business object. From this tile, the user may select desired attributes to be included in the business content structure.

The wizard may also display a "Related Business Objects: All related objects" tile that includes a collection of business objects that are related to the main business object (BOCONGEN). Because a user may typically be interested in including object information in the chart that is related to the main business object, the structured presentation of related business objects provides easy access to these related objects and eliminates the need to search for the objects. Also, a "Relationship Properties: All properties" tile may be displayed that includes a group of business object attributes associated with a selected business object in the "Related Business Objects: All related objects" tile. By displaying the main business object and its associated attributes, along with related business objects and their associated attributes, the business content provider component provides the user with a convenient and flexible design environment, allowing business content structures to be quickly and easily designed. The user can efficiently design content for a chart without having to model business queries and/or write program code to describe the desired content. This permits users who may not be skilled in programming or coding to effectively design content for reports or charts using an object-based approach.

A user may define related business objects with respect to the main business object. To do so, the wizard may display a pop-up window that includes a "Relationship Details" section and a "Relationship Parameters" section. The "Relationship Details" section may include input fields for specifying a relationship unique name that may be unique to the business content structure, a relationship type, and a child business object. A relationship name field may list a previously defined relationship name, using a mobile application studio component, for example. In THE FIG. 13 example, the related business object is "BOACTIVITY," and contains activity information for the parent business object (BOCONEN). The "Relationship Parameters" section lists parameters or properties that define the relationship between the main business object and the related business object. These properties can be used to obtain information on the related business object when searching the database 150 for associated data.

Referring again to FIG. 13, the "Business Content Provider Structure" tile 1358 shows a pictorial representation of the main business object "BOCONGEN," and the related business object "BOACTIVITY" that was defined using the wizard. The related business object "BOACTIVITY" is shown connected to the main business object "BOCONGEN" through a connecting line (labeled "COLBOACTIVITY"), which symbolizes the relationships between the main object and the related object.

In addition to the previously defined business object attributes that are associated with a given business object, a user may also define a formula for a calculated field. This permits the user to define additional attributes to be included in the business content structure, and which will appear in the chart. To do this, an "Add Formula" button may be provided that causes a display of a pop-up window with a "Formula Definition" section and a "Formula Parameters" section. Drop-down lists of choices may be implemented to guide user selection from a group of framework-supported formulas.

The formula may be a user-defined formula that accepts one or more parameters and returns a value. This provides flexibility and may be appropriate in situations where a user desires a chart having attributes not previously defined and/or maintained. Currency conversion (e.g., when prices for sales items are maintained in euros, the user may wish to report the prices in U.S. dollars) and language translation are examples where formulas may be useful. The formula may be executed at run-time by a business content supplier module, for example, and the value may be transmitted to the chart execution application along with the business content structure and the data. Alternatively, the formula may be a previously defined formula. The parameters may include data retrieved from a database, such as database 150 (FIG. 5), or from a user data dictionary, which may be appropriate for language conversion formulae.

The business content structure can be persistently stored in a database, such as database 150, for future use. This may permit a user to later select the business content structure and generate a chart with current data at the time of chart generation. In one implementation, the business content structure is stored as an XML document in the database 150, and each object attribute in the business content structure corresponds to a tag of the XML document.

Briefly, at run time, data are retrieved that are associated with the defined business content structure. This may involve first fetching the business content structure, interpreting the collection (for example, reading and interpreting the XML document in which the business content structure is stored), and constructing database queries for accessing the data. The database queries may be, for example, Structured Query Language (SQL) queries, and may utilize a derived table concept whereby fewer queries may be needed to retrieve data associated with related objects.

An output file may be generated for a chart execution application to use to generate the chart. The output file may include the business content structure information and the retrieved data associated therewith. Because only those business object attributes present in the business content structure (and not every attribute associated with a particular business object) will be included in the generated output file, performance may be improved. In one implementation, a standard output format such as an ActiveX Data Object (ADO) Recordset is generated.

Referring now to FIG. 14, a screen snapshot 1400 is shown that shows a chart details work area 1404 for the chart being defined, which is similar in format to the screen snapshot of FIG. 6 previously described. As shown in the "Chart Definition" tile 1406, it is shown that the business content provider database query uniquely named as "Contact Activity BCP" has been associated with the chart. As such, that associated database query will be executed as part of the process of generating the chart at run time.

The chart "Details" sub-component work area 1404 may also be used to define the object attribute that is to be used as the category axis in the chart. In addition, work area may be used to define the data series, or multiple different data series, to be used in the chart. As discussed, a formula to calculate the value measures for the data series may have been defined using the business content provider tool. In addition, as described previously, a user selectable "Customize" button provided in the "Chart Definition" tile 1406 may be selected to launch a program to customize the look and feel of the chart, as described previously in connection with FIG. 7.

The "Data Source Properties" tile 1410 and additional associated tiles not shown, is used to define the chart axes, namely, the category axis and the one or more data series for the value axis, as described previously in connection with FIG. 6. Also, the possible chart parameters used for run-time data filtering are defined using tiles 1412 and 1414, as also discussed previously. Selections of the properties and parameters for the chart may be made from attributes and calculations defined in the business content provider query. In addition, descriptions for the chart elements and parameters may be defined using the "Element Descriptions" and "Parameter Descriptions" sub-components, as described previously.

Referring now to FIG. 15, a screen snapshot 1500 is shown that allows a user to define the chart element descriptions, as described previously in connection with FIG. 8. Changing the "Chart Status" field (FIG. 14) from "Not-Executable" to "Executable" causes the chart definition to be saved, for example in an chart definition file that is stored in database 152.

Figure 16:
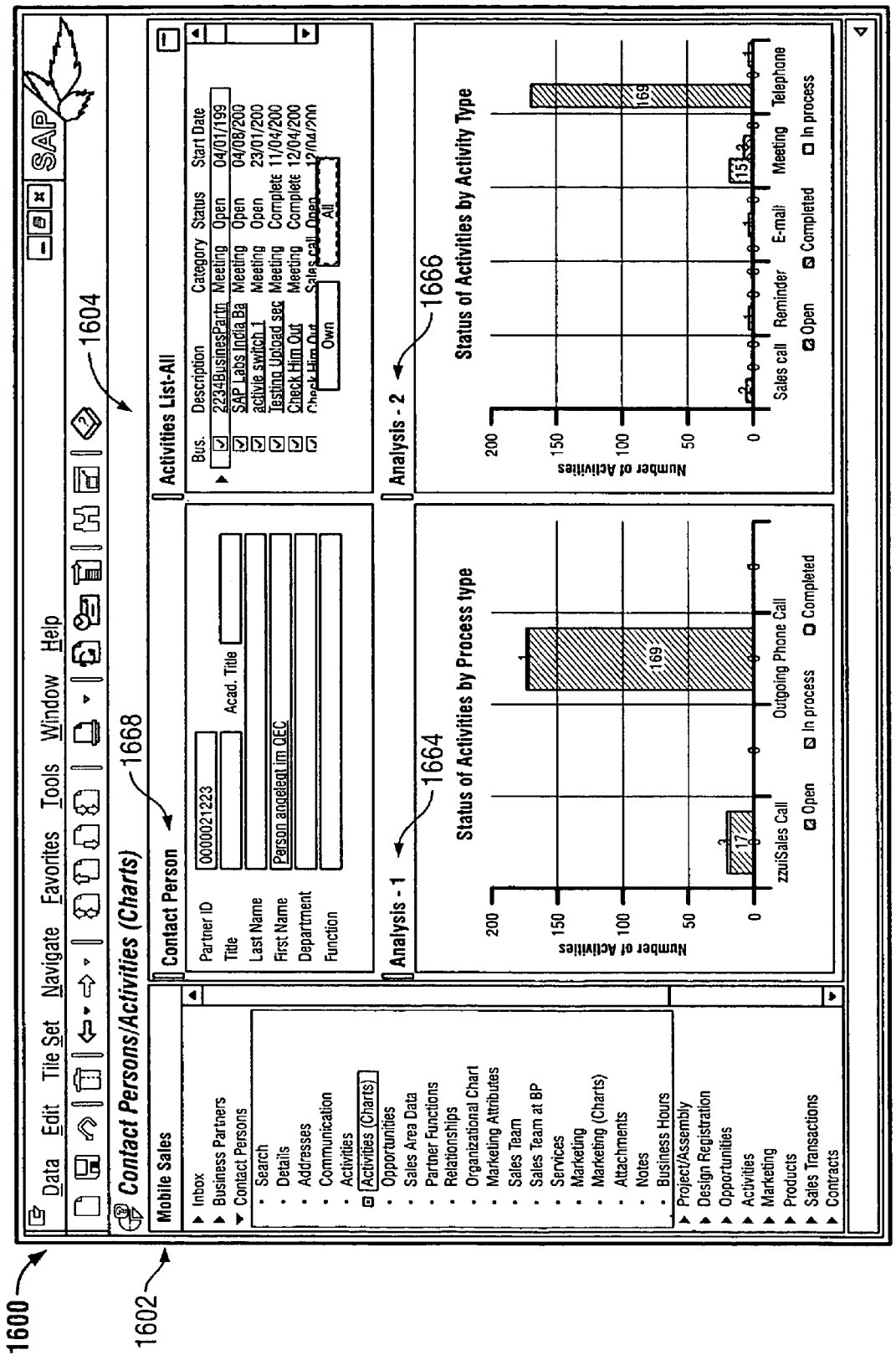
FIGS. 16-17 are computer screen snapshots that illustrate two different examples of graphical charts being displayed during a run time.

Referring now to FIG. 16, a screen snapshot 1600 is provided that shows how charts may be integrated into a component of a software application. In this example, the application is a "Mobile Sales" application, as indicated by the header on top of the menu listing area 1602. These components and sub-components may be assigned in the chart definition file using the "Assigned Components" tile 608 shown in FIG. 6. Also, the particular tile set configuration for all tiles associated with the software application component may be specified using a tile set design tool, such as a mobile application studio tool. In FIG. 16, the business component associated with the charts is a "Contact Persons" component and the sub-component is a "Activities (Charts)" sub-component, as shown in the menu listing area 1602. The "Activities (Charts)" sub-component is shown as having been selected. As such, predefined tile sets associated with that sub-component are displayed in work area 1604.

The work area 1604 includes two predefined charts that are displayed in two different tiles located at the bottom of the work area 1604. In tile 1664, a predefined chart entitled "Status of Activities by Process type" is displayed. This chart is a stacked column type of chart with multiple data series that use a common value axis scale. In tile 1666, a predefined chart entitled "Status of Activities by Activity Type" is provided. This chart is also a column chart with multiple data series that use a common value axis scale, but instead of being a stacked column chart, the different data series are displayed side by side for each of the category axis values.

The charts shown in tiles 1664 and 1666, in this example, are filtered to include only activities for a particular contact person with a "Partner ID" of "0000021223," as specified in tile 1668. In this example, "Partner ID" was defined to be a "parameter" for the chart using, for example, parameter definition tiles 1412 and 1414 shown in FIG. 14.

Figure 17:
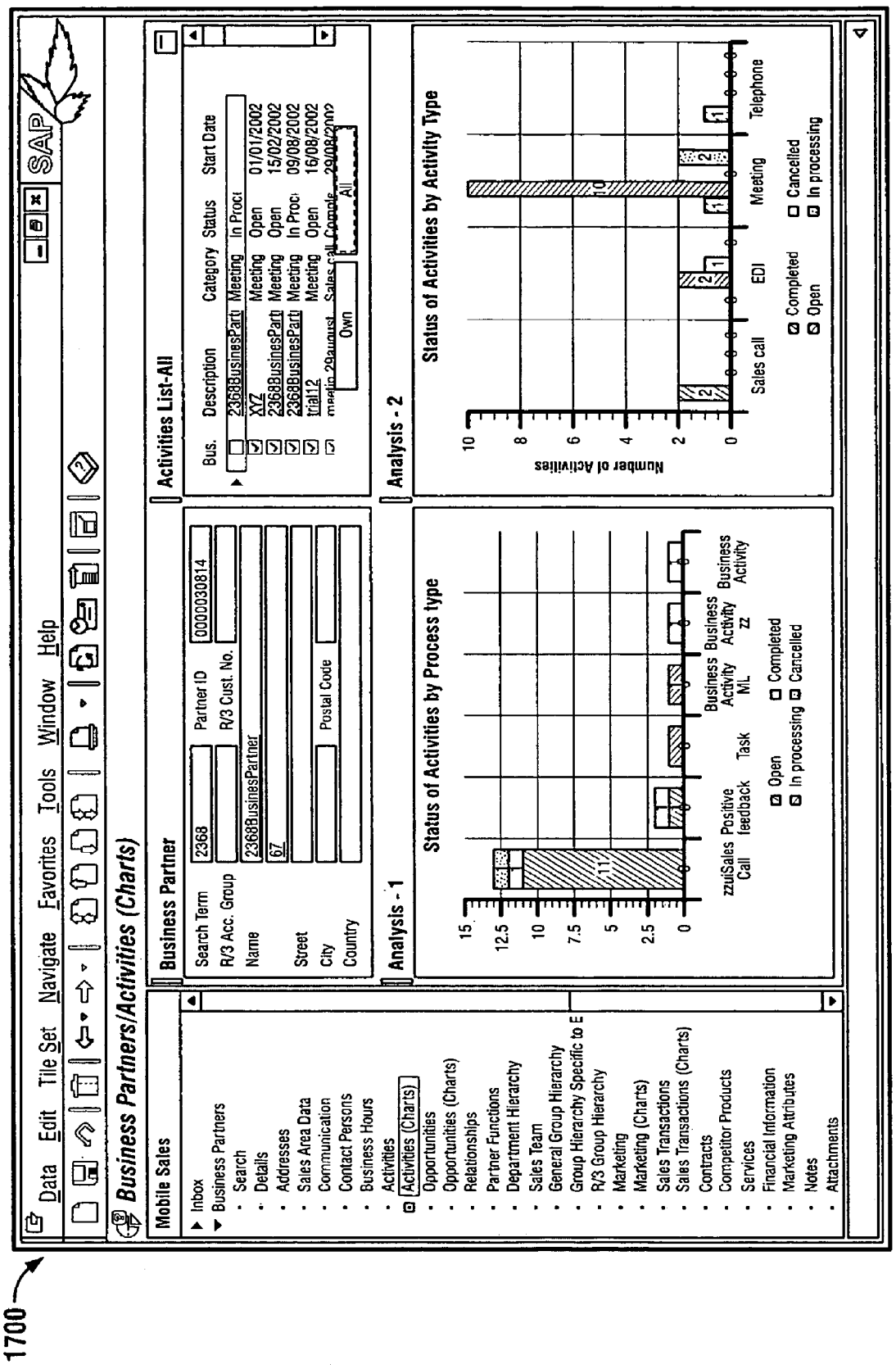

In FIG. 17, screen snapshot 1700 similarly shows another tile set that includes two different predefined charts. These charts are made available under a "Business Partner" component for the mobile sales software application. In addition, these charts are filtered to a particular business partner having an ID of "0000030814."

Thus it can be seen that predefined charts may be easily defined and made available at useful places within a software application. This allows the chart to be made available where the user would like to see them, thereby aiding in the decision making process.

A number of embodiments of the invention have been described. Nevertheless, it will be understood that various modifications may be made without departing from the spirit and scope of the invention. Accordingly, other embodiments are within the scope of the following claims.

What is claimed is:

1. A method of defining a chart that graphically represents data stored in an electronic data source, the method comprising:

causing display of a first graphical user interface of a chart maintenance program that enables a user to define display characteristics of a chart within a second graphical user interface of a software application that is different than the chart maintenance program;

receiving, using the first graphical user interface of the chart maintenance program, a user selection of 1) a data object family contained in the electronic data source, and 2) an attribute for the selected data object family, wherein the selected attribute has multiple possible predefined values that are to serve as category axis values in the chart;

receiving, using the first graphical user interface of the chart maintenance program, user identification of a database query to perform on the electronic data source to obtain data needed to generate the chart, the data including data for the selected data object family;

receiving, using the first graphical user interface of the chart maintenance program, a user definition of a first data series comprising a value measure to be determined for each of the category axis values and that uses stored data associated with the data object family;

receiving, using the first graphical user interface of the chart maintenance program, user selection of the software application to associate with the chart, the software application including multiple business components that each correspond to a different work area within the second graphical user interface of the software application;

receiving, using the first graphical user interface of the chart maintenance program, user selection, from among the multiple business components included in the software application, of a business component included in the software application to associate with the chart, the selected business component corresponding to a particular work area within the second graphical user interface of the software application and the user selection of the business component defining that the chart is displayed in the particular work area within the second graphical user interface of the software application during run time execution of the software application;

receiving, using the first graphical user interface of the chart maintenance program, user selection of an executable setting for the chart that controls whether or not the chart is displayed in the particular work area within the second graphical user interface of the software application during runtime execution of the software application, the executable setting being selected from among at least a first setting that controls the chart to be displayed in the particular work area within the second graphical user interface of the software application during runtime execution of the software application and a second setting that controls the chart not to be displayed in the particular work area within the second graphical user interface of the software application during runtime execution of the software application; and storing an electronic chart definition file including an identification of the selected data object attribute, an identification of the database query, the defined first data series, the software application associated with the chart, the business component associated with the chart, and the executable setting that controls whether or not the chart is made available during runtime execution of the software application.

2. The method of claim 1 further comprising:

receiving a user definition of a second data series comprising a second value measure to be determined for each of the category axis values and that uses stored data associate with the data object family; and storing the defined second data series in the stored electronic definition file.

3. The method of claim 2 wherein the defined first and second data series are defined to use a common value axis scale.

4. The method of claim 2 wherein the defined first and second data series are defined to use different value axis scales.

5. The method of claim 1 further comprising receiving user definitions of display attributes for the chart.

6. The method of claim 5 wherein the user definitions of the display attributes are received within a launched chart control component.

7. The method of claim 1 further comprising:

in response to receiving user selection of the software application to associate with the chart and user selection of the business component included in the software application to associate with the chart, integrating the chart into the business component included in the software application.

8. The method of claim 7 further comprising:

receiving, during execution of the business component included in the software application, a selection of a chart display sub-component of the business component; and in response to receiving the selection of a chart display sub-component of the business component:

programmatically accessing the electronic chart definition file; and programmatically generating and displaying the chart by executing the database query defined in the electronic chart definition file and arranging data retrieved from the database query in the chart in accordance with the electronic chart definition file.

9. The method of claim 8 wherein the electronic chart definition file is not accessed and the chart is not generated and displayed in response to selection of another chart display sub-component of another business component included in the software application.

10. The method of claim 1 wherein the chart is only made available, within the software application, in the particular work area that corresponds to the selected business component such that the chart is not made available in work areas within the software application that correspond to the multiple business components included in the software application that were not selected.

11. The method of claim 1 further comprising:

in response a user accessing the particular work area within the software application that corresponds to the selected business component:

programmatically accessing the electronic chart definition file, and programmatically generating and displaying the chart within the particular work area by executing the database query defined in the electronic chart definition file and arranging data retrieved from the database query in the chart in accordance with the electronic chart definition file.

12. The method of claim 11 further comprising:
during run time execution of the software application, receiving user input navigating from a first work area within the software application to the particular work area within the software application that corresponds to the selected business component, the first work area being different than the particular work area; and
in response to receiving the user input navigating from the first work area to the particular work area, displaying an interface that corresponds to the particular work area,
wherein programmatically generating and displaying the chart within the particular work area comprises programmatically generating and displaying the chart within the interface that corresponds to the particular work area in response to receiving the user input navigating from the first work area to the particular work area.

13. The method of claim 1 wherein receiving user selection of a software application to associate with the chart comprises receiving user selection of a business software application to associate with the chart, the business software application including multiple business components that each correspond to a different work area within the business software application and the business software application being at least one of a mobiles sales software application, a customer relationship management software application, and a supply chain management software application.

14. The method of claim 1, further comprising:
during run time execution of the software application, receiving user input navigating from a first work area within the software application to the particular work area within the software application that corresponds to the selected business component, the first work area being different than the particular work area; and
in response to receiving the user input navigating from the first work area to the particular work area:
displaying an interface that corresponds to the particular work area;
programmatically generating and displaying the chart within the interface that corresponds to the particular work area conditioned on the executable setting for the chart having been selected as the first setting that controls the chart to be made available for display during runtime execution of the software application; and
maintaining the interface that corresponds to the particular work area without displaying the chart conditioned on the executable setting for the chart having been selected as the second setting that controls the chart not to be available for display during runtime execution of the software application.

15. A computer program product tangibly stored on non-transitory computer-readable memory and comprising program instructions that, when executed, perform a method to define a chart that graphically represents data stored in an electronic data source, wherein the method comprises:
causing display of a first graphical user interface of a chart maintenance program that enables a user to define display characteristics of a chart within a second graphical user interface of a software application that is different than the chart maintenance program;
receiving, using the first graphical user interface of the chart maintenance program, a user selection of 1) a data object family contained in the electronic data source, and 2) an attribute for the selected data object family, wherein the selected attribute has multiple possible predefined values that are to serve as category axis values in the chart;
receiving, using the first graphical user interface of the chart maintenance program, user identification of a database query to perform on the electronic data source to obtain data needed to generate the chart, the data including data for the selected data object family;
receiving, using the first graphical user interface of the chart maintenance program, a user definition of a first data series comprising a value measure to be determined for each of the category axis values and that uses stored data associated with the data object family;
receiving, using the first graphical user interface of the chart maintenance program, user selection of the software application to associate with the chart, the software application including multiple business components that each correspond to a different work area within the second graphical user interface of the software application;
receiving, using the first graphical user interface of the chart maintenance program, user selection, from among the multiple business components included in the software application, of a business component included in the software application to associate with the chart, the selected business component corresponding to a particular work area within the second graphical user interface of the software application and the user selection of the business component defining that the chart is displayed in the particular work area within the second graphical user interface of the software application during run time execution of the software application;
receiving, using the first graphical user interface of the chart maintenance program, user selection of an executable setting for the chart that controls whether or not the chart is displayed in the particular work area within the second graphical user interface of the software application during runtime execution of the software application, the executable setting being selected from among at least a first setting that controls the chart to be displayed in the particular work area within the second graphical user interface of the software application during runtime execution of the software application and a second setting that controls the chart not to be displayed in the particular work area within the second graphical user interface of the software application during runtime execution of the software application; and
storing an electronic chart definition file including an identification of the selected data object attribute, an identification of the database query, the defined first data series, the software application associated with the chart, the business component associated with the chart, and the executable setting that controls whether or not the chart is made available during runtime execution of the software application.

16. The computer program product of claim 15 wherein the method further comprises:
receiving a user definition of a second data series comprising a second value measure to be determined for each of the category axis values and that uses stored data associate with the data object family; and
storing the defined second data series in the stored electronic definition file.

17. The computer program product of claim 16 wherein the defined first and second data series are defined to use a common value axis scale.

18. The computer program product of claim 16 wherein the defined first and second data series are defined to use different value axis scales.

19. The computer program product of claim 15 wherein the method further comprises receiving user definitions of display attributes for the chart.

20. A system comprising:
- at least one computer; and
- at least one non-transitory computer-readable medium coupled to the at least one computer and having instructions stored thereon which, when executed by the at least one computer, causes the at least one computer to perform operations comprising:
- causing display of a first graphical user interface of a chart maintenance program that enables a user to define display characteristics of a chart within a second graphical user interface of a software application that is different than the chart maintenance program;
- receiving, using the first graphical user interface of the chart maintenance program, a user selection of 1) a data object family contained in the electronic data source, and 2) an attribute for the selected data object family, wherein the selected attribute has multiple possible predefined values that are to serve as category axis values in the chart;
- receiving, using the first graphical user interface of the chart maintenance program, user identification of a database query to perform on the electronic data source to obtain data needed to generate the chart, the data including data for the selected data object family;
- receiving, using the first graphical user interface of the chart maintenance program, a user definition of a first data series comprising a value measure to be determined for each of the category axis values and that uses stored data associated with the data object family;
- receiving, using the first graphical user interface of the chart maintenance program, user selection of the software application to associate with the chart, the software application including multiple business components that each correspond to a different work area within the second graphical user interface of the software application;
- receiving, using the first graphical user interface of the chart maintenance program, user selection, from among the multiple business components included in the software application, of a business component included in the software application to associate with the chart, the selected business component corresponding to a particular work area within the second graphical user interface of the software application and the user selection of the business component defining that the chart is displayed in the particular work area within the second graphical user interface of the software application during run time execution of the software application;
- receiving, using the first graphical user interface of the chart maintenance program, user selection of an executable setting for the chart that controls whether or not the chart is displayed in the particular work area within the second graphical user interface of the software application during runtime execution of the software application, the executable setting being selected from among at least a first setting that controls the chart to be displayed in the particular work area within the second graphical user interface of the software application during runtime execution of the software application and a second setting that controls the chart not to be displayed in the particular work area within the second graphical user interface of the software application during runtime execution of the software application; and
- storing an electronic chart definition file including an identification of the selected data object attribute, an identification of the database query, the defined first data series, the software application associated with the chart, the business component associated with the chart, and the executable setting that controls whether or not the chart is made available during runtime execution of the software application.

* * * * *